US011886497B2

(12) United States Patent
Goffman et al.

(10) Patent No.: US 11,886,497 B2
(45) Date of Patent: *Jan. 30, 2024

(54) SYSTEM FOR CREATING VIDEO FILE FOR AUDIO SNIPPET OF PODCAST AUDIO FILE AND RELATED METHODS

(71) Applicant: PICKED CHERRIES INC., Fort Lauderdale, FL (US)

(72) Inventors: Stuart M. Goffman, Fort Lauderdale, FL (US); Alexander Leon, Fort Lauderdale, FL (US)

(73) Assignee: PICKED CHERRIES INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,827

(22) Filed: Apr. 10, 2023

(65) Prior Publication Data

US 2023/0350942 A1 Nov. 2, 2023

Related U.S. Application Data

(63) Continuation-in-part of application No. 17/661,358, filed on Apr. 29, 2022, now Pat. No. 11,650,789.

(51) Int. Cl.
*G06F 16/64* (2019.01)
*G11B 27/031* (2006.01)
(52) U.S. Cl.
CPC .......... *G06F 16/64* (2019.01); *G11B 27/031* (2013.01)

(58) Field of Classification Search
CPC ..... G10L 25/15; G10L 15/063; G10L 15/083; G10L 15/1822; G10L 15/22; G10L 15/26;
(Continued)

(56) References Cited

U.S. PATENT DOCUMENTS 9,092,542 B2 7/2015 Bodin et al.
10,108,619 B2 10/2018 DiMaria et al.
(Continued)

OTHER PUBLICATIONS

Stegmann, Andreas "What™ s missing: Podcast Snippets Platform" https://medium.com/hyperlinked/startup-idea-1-podcast-snippets-platform-33e38b705e9 : Jul. 3, 2019; pp. 8.
(Continued)

*Primary Examiner* — Rayeez R Chowdhury
(74) *Attorney, Agent, or Firm* — Allen, Dyer, Doppelt + Gilchrist, PA

(57) ABSTRACT

An audio podcast distribution system includes a server configured to aggregate and store podcast audio files in a database. A computing device is configured to render an audio playback GUI on a display for playing a given podcast audio file from the database. The audio playback GUI includes a playback control user input, and an audio snippet creation user input. The computing device is configured to render an audio snippet playback GUI on the display, the audio snippet playback GUI include a video creation user input, and when the video creation user input is activated, send a video request to the server. The server is configured to, based upon the video request, generate a video file having the audio snippet of the given podcast audio file, and image data in the database associated with the given podcast audio file.

20 Claims, 23 Drawing Sheets

(58) Field of Classification Search
CPC ..... G10L 2015/088; G06F 2203/04803; G06F 3/0482; G06F 3/04817; G06F 40/166; G06F 16/40; G06F 16/70; G06F 16/60
See application file for complete search history.

(56) References Cited

U.S. PATENT DOCUMENTS

| | | |
|---|---|---|
| 10,958,876 B2 | 3/2021 | Gilley et al. |
| 2008/0039010 A1 | 2/2008 | Vance et al. |
| 2010/0312807 A1 | 12/2010 | Mitsuzumi et al. |
| 2012/0173865 A1 | 7/2012 | Swaminathan |
| 2014/0007257 A1 | 1/2014 | Dougherty et al. |
| 2016/0196270 A1 | 7/2016 | DiMaria et al. |
| 2018/0276540 A1 | 9/2018 | Xing |
| 2020/0154079 A1 | 5/2020 | Gilley et al. |
| 2020/0321005 A1 | 10/2020 | Iyer et al. |
| 2021/0377663 A1 | 12/2021 | Carrigan et al. |
| 2022/0020376 A1* | 1/2022 | Garg ................... G06F 40/295 |
| 2022/0189173 A1 | 6/2022 | Zhou et al. |
| 2022/0248187 A1 | 8/2022 | Reese et al. |

OTHER PUBLICATIONS

Arment, Marco "Clip sharing with Overcast" https://marco.org/2019/04/27/overcast-clip-sharing; Apr. 27, 2019; pp. 2.

Transistor "How to make an audiogram for your podcast (shareable video clip)" https://transistor.fm/podcast-audio-video-clip/Mar. 20, 2022; pp. 2.

\* cited by examiner

SYSTEM FOR CREATING VIDEO FILE FOR AUDIO SNIPPET OF PODCAST AUDIO FILE AND RELATED METHODS

RELATED APPLICATION

This application is a continuation-in-part of prior filed copending application Ser. No. 17/661,358 filed Apr. 29, 2022, the entire subject matter of which is incorporated herein by reference in its entirety.

TECHNICAL FIELD

The present disclosure relates to the field of audio processing system, and, more particularly, to an audio podcast distribution system and related methods.

BACKGROUND

A podcast is a program made available in digital format (typically audio format) for download over the Internet. Although not required for the format, most podcasts are episodic in nature, for example, delivered daily or weekly. The popularity of podcasts has increased substantially over the last decade even though the format is nearly twenty years old. Indeed, the format arguably languished for the first few years of its existence. For example, in 2006, podcast awareness was a mere 22% of the United States population, and that figure has risen to 78% in the next sixteen years.

One of the main drivers of the popularity of the format was the improvement in the applications for listening to podcasts. In the early years, podcast applications were application specific and did very little else. As the format became more mature, several large players in the mobile software field integrated podcast functionality into their audio players, which increased access to the format. More importantly, ecosystems within those audio players developed and permitted ratings and rankings of podcasts.

Once drawback to podcast applications is the inability for users to share the podcasts. Most applications permit you to share the podcast feed so others may subscribe to the same format. Some applications may even permit you to share the entire podcast in a compressed format, such as MP3. Nonetheless, for long form podcasts, which can last several hours, this is a bit cumbersome and inconvenient for the user.

SUMMARY

Generally, an audio podcast distribution system comprises a server configured to aggregate and store a plurality of podcast audio files in a database, and at least one computing device in communication with the server. The at least one computing device comprises a processor and a display coupled to the processor. The processor is configured to render an audio playback graphical user interface (GUI) on the display for playing a given podcast audio file from the database. The audio playback GUI comprises a playback control user input, and an audio snippet creation user input. The processor is configured to when the audio snippet creation user input is activated, render an audio snippet creation GUI for generating an audio snippet of the given podcast audio file, and upload at least one file parameter for the audio snippet of the given podcast audio file to the database. The processor is also configured to render an audio snippet playback GUI on the display, the audio snippet playback GUI comprising a video creation user input, and when the video creation user input is activated, send a video request to the server, the video request being associated with the audio snippet of the given podcast audio file. The server is configured to, based upon the video request, generate a video file comprising the audio snippet of the given podcast audio file, and image data in the database associated with the given podcast audio file.

Additionally, the server may be configured to add the video file of the audio snippet of the given podcast audio file to the database, and generate a custom link to access the video file within the database. In some embodiments, the server may be configured to generate the video file by at least generating sequential screenshots of the audio snippet playback GUI, and combining the sequential screenshots with the audio snippet of the given podcast audio file. The server may be configured to access the video file when another video request is received for the same audio snippet of the given podcast audio file.

Also, the audio snippet creation GUI may comprise a visual waveform input, and an audio snippet creation playback control user input. The server may be configured to add the audio snippet of the given podcast audio file to the database, and generate a custom link to access the audio snippet within the database.

In some embodiments, the at least one computing device may comprise a plurality of computing devices configured to respectively upload a plurality of audio snippets to the server, and the server may be configured to rank the plurality of audio snippets based upon heuristics data for respective users associated with the plurality of computing devices. The heuristic data may comprise audio playback data and audio playback completion event data. The processor may be configured to render an audio snippet discovery GUI on the display for viewing the plurality of audio snippets, the audio snippet discovery GUI configured to receive swipe input to scroll through the plurality of audio snippets.

Another aspect is directed to a method for operating an audio podcast distribution system comprising at least one computing device, and a server configured to aggregate and store a plurality of podcast audio files in a database. The at least one computing device is in communication with the server. The method comprises rendering an audio playback GUI on a display of the at least one computing device for playing a given podcast audio file from the database. The audio playback GUI comprises a playback control user input, and an audio snippet creation user input. The method also includes when the audio snippet creation user input is activated, rendering an audio snippet creation GUI on the display of the at least one computing device for generating an audio snippet of the given podcast audio file, and uploading at least one file parameter for the audio snippet of the given podcast audio file to the database. The method also includes rendering an audio snippet playback GUI on the display of the at least one computing device, the audio snippet playback GUI comprising a video creation user input, and when the video creation user input is activated, send a video request to the server. The video request is associated with the audio snippet of the given podcast audio file. The method also includes generating, at the server, based upon the video request a video file comprising the audio snippet of the given podcast audio file, and image data in the database associated with the given podcast audio file.

Yet another aspect is directed to a non-transitory computer-readable medium for operating an audio podcast distribution system comprising at least one computing device, and a server configured to aggregate and store a plurality of podcast audio files in a database. The at least one computing device is in communication with the server. The non-transitory computer-readable medium has computer-executable instructions for causing the at least one computing device and the server to perform steps comprising rendering an audio playback GUI on a display of the at least one computing device for playing a given podcast audio file from the database. The audio playback GUI comprises a playback control user input, and an audio snippet creation user input. The steps also includes when the audio snippet creation user input is activated, rendering an audio snippet creation GUI on the display of the at least one computing device for generating an audio snippet of the given podcast audio file, and uploading at least one file parameter for the audio snippet of the given podcast audio file to the database. The steps also includes rendering an audio snippet playback GUI on the display of the at least one computing device, the audio snippet playback GUI comprising a video creation user input, and when the video creation user input is activated, send a video request to the server. The video request is associated with the audio snippet of the given podcast audio file. The steps also includes generating, at the server, based upon the video request a video file comprising the audio snippet of the given podcast audio file, and image data in the database associated with the given podcast audio file.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1:
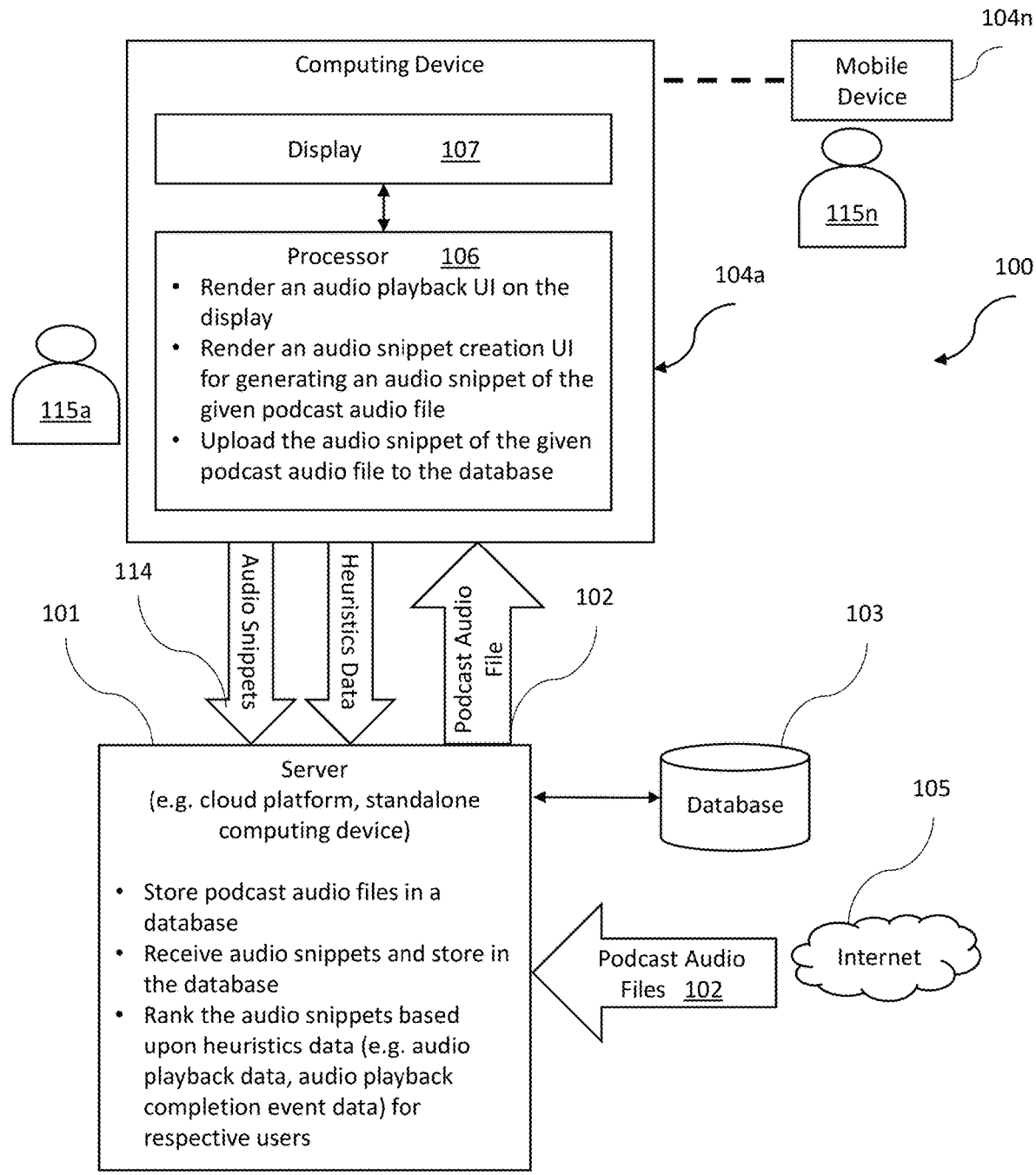
FIG. 1 is a schematic diagram of a first embodiment of an audio podcast distribution system, according to the present disclosure.
Figure 2:
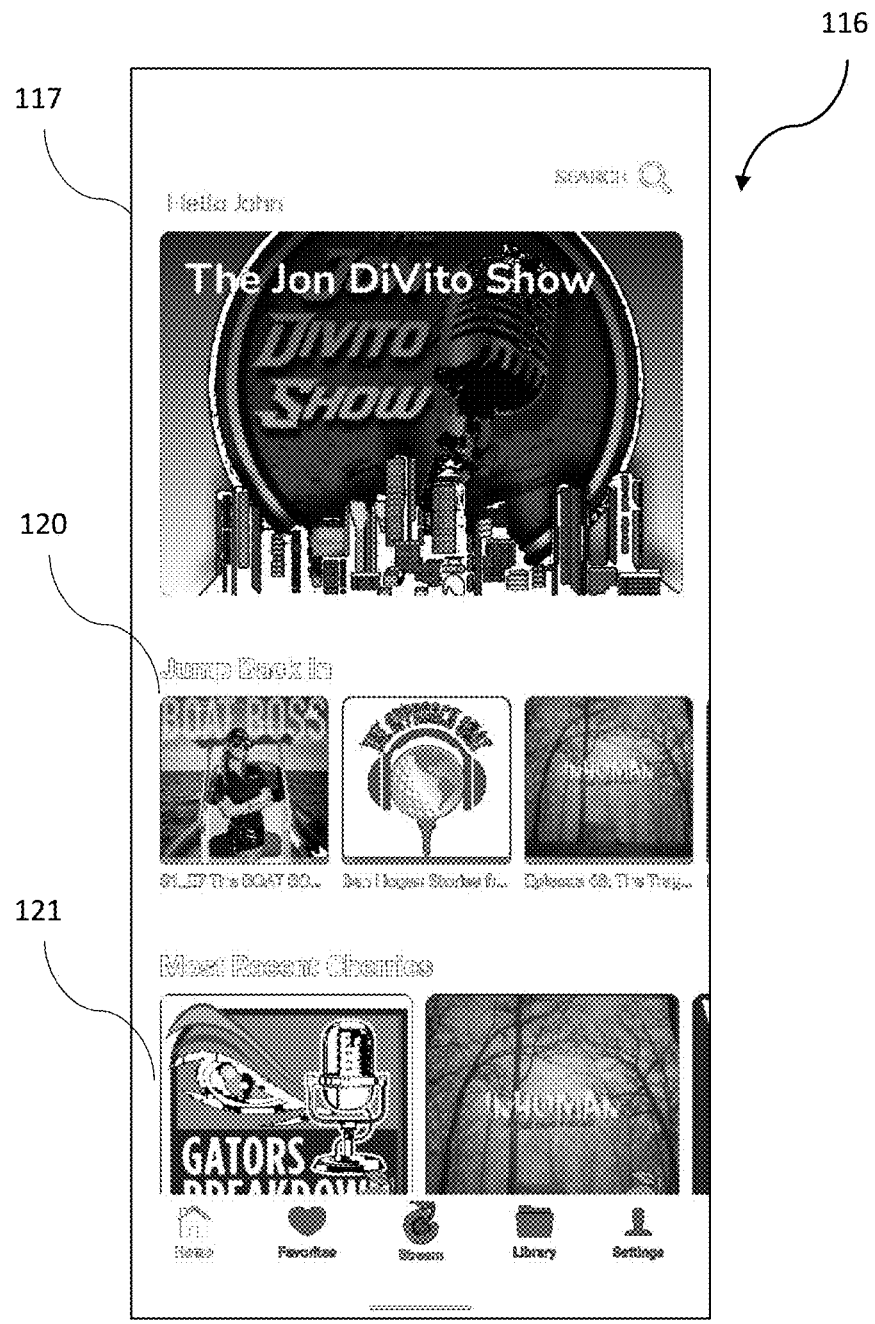
FIGS. 2-16 are screenshots of an example embodiment GUI from the computing device of the audio podcast distribution system of FIG. 1.
Figure 3:
Figure 4:
Figure 5:
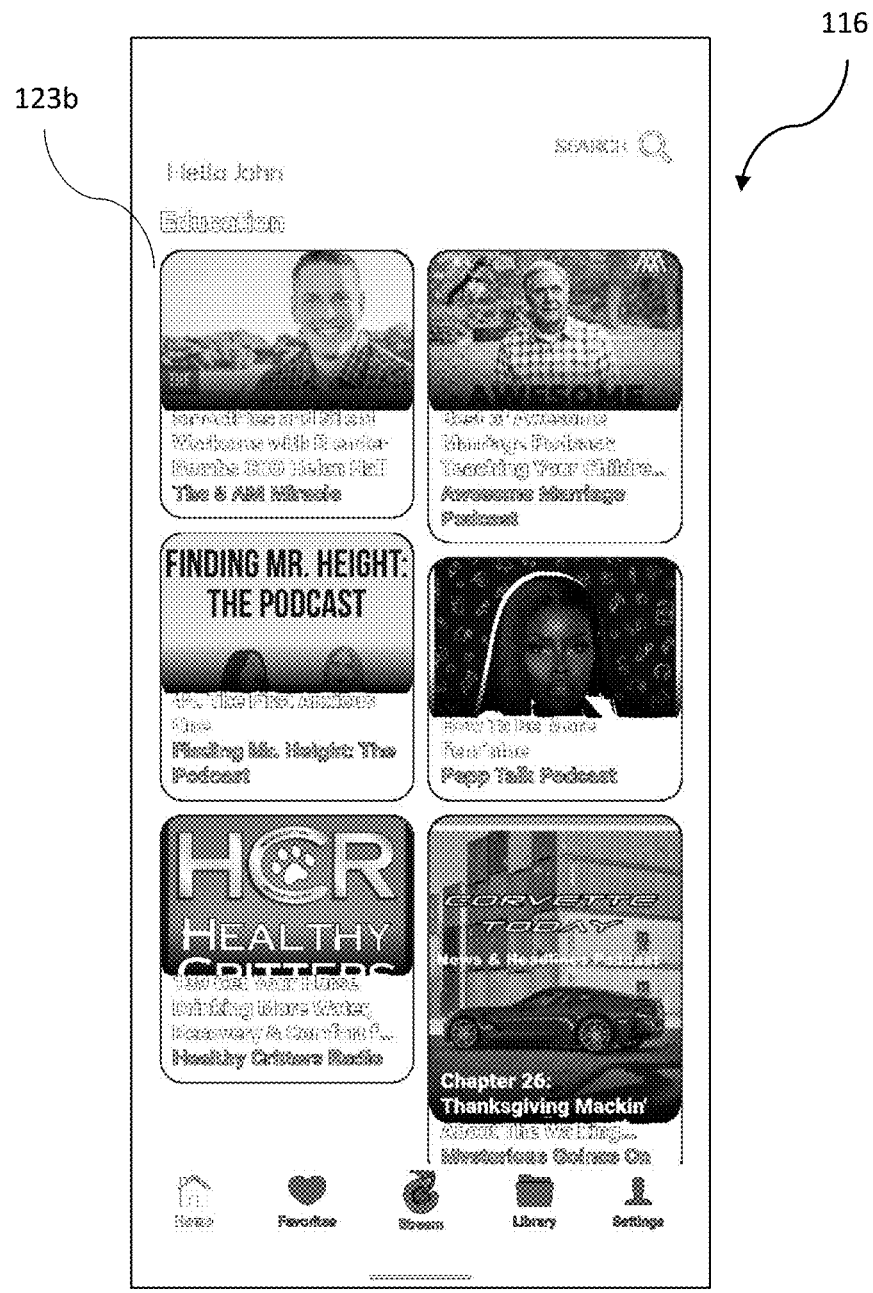

Referring initially to FIG. 1, an audio podcast distribution system 100 according to the present disclosure is now described. The audio podcast distribution system 100 illustratively includes a server 101 configured to aggregate and store a plurality of podcast audio files 102 in a database 103, and a plurality of computing devices 104a-104n in communication with the server over the Internet 105. The server 101 is configured to check for new podcast audio files 102 periodically, for example, every 15 minutes. As will be appreciated, the server 101 may use Really Simple Syndication (RSS) feeds to monitor for new files.

The server 101 may comprise one or more of assigned resources on a cloud computing platform (e.g. Google Cloud Platform, Amazon Web Services, and Microsoft Azure) and a stand-alone computing device. For illustrative clarity, only one of the plurality of computing devices 104a is shown in detail, but it should be appreciated that the other computing devices may be similarly constituted. Also, the plurality of computing devices 104a-104n may comprise one or more of the following computing device types: a mobile device type, a mobile cellular device type, a tablet computing device type, a desktop computing device type, or a laptop computing device type.

The computing device 104a illustratively comprises a processor 106 and a display 107 coupled to the processor. In some embodiments, the display 107 may comprise a touchscreen input display. In other embodiments, the computing device 104a may include other input/output devices, such as a mouse device or keyboard device.

The processor 106 is configured to execute podcast software for accessing the server 101 and the plurality of podcast audio files 102 in the database 103. As will be appreciated, the podcast software may be implemented via a native operating system of the computing device 104a, and/or be implemented within a web browser, for example, using Web 3.0 features. As will be appreciated, the podcast software includes a GUI with multiple subpart GUIs.

Referring now additionally to FIGS. 2-16, the processor 106 is configured to render an audio playback GUI 110 on the display 107 for playing a given podcast audio file 102 from the database 103. The audio playback GUI 110 includes a playback control user input 111 (i.e. the play/pause button, the rewind 15 seconds button, and the forward 15 seconds button), and an audio snippet creation user input 112. The processor is configured to when the audio snippet creation user input 112 is activated, render an audio snippet creation GUI 113 (FIGS. 12-15) for generating an audio snippet 114 of the given podcast audio file 102, and upload the audio snippet of the given podcast audio file to the database 103. Of course, in other embodiments, the server 101 may create the audio snippet 114.

In the illustrated embodiment, some or all of the plurality of computing devices 104a-104n are configured to respectively upload a plurality of audio snippets 114 to the server 101. The server 101 is configured to rank the plurality of audio snippets 114 and the plurality of podcast audio files 102 based upon heuristics data for respective users 115a-115n associated with the plurality of computing devices 104a-104b. The heuristic data may comprise audio playback data and audio playback completion event data. In some embodiments, the server 101 is configured to push a ranked list of the plurality of audio snippets 114 to the respective users 115a-115n of the plurality of computing devices 104a-104n.

The server 101 is configured to add the audio snippet 114 of the given podcast audio file 102 to the database 103, and generate a custom link to access the audio snippet within the database. The server 101 may be configured to process the received audio snippet 114 into a compressed audio format, for example, an MP3 file format. In some embodiments, the custom link to access the audio snippet 114 within the database 103 comprises a uniform resource locator (URL) link for accessing the audio snippet from the Internet 105. The custom link to access the audio snippet 114 within the database 103 is parsed by social media crawlers to extract metadata, which permits sharing on the respective social media platforms.

Moreover, the server 101 is configured to monitor access to the custom link to generate additional heuristics data. Also, the podcast software tracks the listening behavior of the respective user 115a-115n for reporting to the server 101. The podcast software will track audio plays, pauses, scrubbing along the progress bar, and audio playback completion events. Each event is time stamped and includes the playback position within the audio. This allows the server 101 to determine the time spent listening to the given podcast audio file 102.

In some embodiments, the server 101 is configured to process the plurality of podcast audio files 102 to generate suggested audio snippets for the respective users 115a-115n. In particular, the server 101 is configured to generate the suggested audio snippets based upon the heuristics data. In some embodiments, the server 101 is configured to generate the suggested audio snippets based upon a machine learning model. In particular, in a supervised machine learning model, the inputs of the supervised machine learning model would be the waveforms of the plurality of podcast audio files 102, metrics from the waveforms indicative of arguments (i.e. high absolute signal levels), and the heuristics data. The output of the supervised machine learning model would be the suggested audio snippets. The supervised machine learning model may be a trained using the created audio snippets in the respective users 115a-115n as training data.

Also, the server 101 is configured to rank subscribed RSS feeds with a priority factor metric. The priority factor metric may be based upon heuristics data noted herein and serves as a proxy for the popularity of the associated podcast audio files 102. The server 101 is configured to poll higher priority factor metric sources first, and then sequentially lower thereafter. For example, the server 101 is configured to poll 0.8 metric value or greater first, then 0.6 metric value or greater, and then 0.4 metric value or greater first.

In some embodiments, the server 101 is configured to use persistent unique identifiers of the respective user 115a-115n to aggregate advertising data, such as web browsing history, search history, and social media interaction history. For example, if the respective user 115a-115n has been browsing jogging websites and searching for jogging shoes, the server 101 is configured to recommend suggested audio snippets for the respective user associated with the topic of jogging. Indeed, this advertising data may be included as an input in the machine learning embodiments.

In some embodiments, the server 101 is configured to render an analytics GUI for displaying the heuristics data, and other user statistics. The analytics GUI may include a user version for the respective users 115a-115n, and a creator version for podcast authors to monitor the popularity of their podcast audio files 102. In the creator version UI, the authors may designate multiple categories and subcategories for their content files. Also, the server 101 is configured to render a content management system (CMS) creation tool/GUI for trending topics now.

In the illustrated embodiment, the server 101 is configured to store the plurality of podcast audio files 102, the uploaded audio snippets 114, and associated metadata for these files in the database 103. The associated metadata may also include keywords and tags, which can be searched within the podcast software. In other embodiments, the storage may be partially on the plurality of computing devices 104a-104b.

In some embodiments, the podcast software may include a playlist UI for storing a queue of podcast audio files 102, and audio snippets 114. The playlist queue may be curated by the respective user 115a-115n, feature podcast authors, and ranked lists of system wide audio snippets.

Referring now to FIGS. 2-5, in particular, the processor is configured to render a GUI including a home screen GUI 116 on the display 107. The home screen GUI 116 illustratively includes a top suggested podcast menu 117. The top suggested podcast menu 117 comprises a suggested podcast audio file 102 for the respective user 115a-115n based upon the heuristic data associated with the respective user. The home screen GUI 116 illustratively includes a continued playback menu 120 (i.e. restarting prior podcast audio files 102 that were partially listened to), and a most recent audio snippet menu 121 for accessing recently created audio snippets by the respective user 115a-115n.

The home screen GUI 116 illustratively includes a suggested audio snippet menu 122 including a set of suggested audio snippets 114 from the database 103 for the respective user 115a-115n based upon the heuristic data associated with the respective user. The home screen GUI 116 illustratively includes a plurality of subject matter specific menus 123a-123b including categorized audio podcast files.

Figure 6:
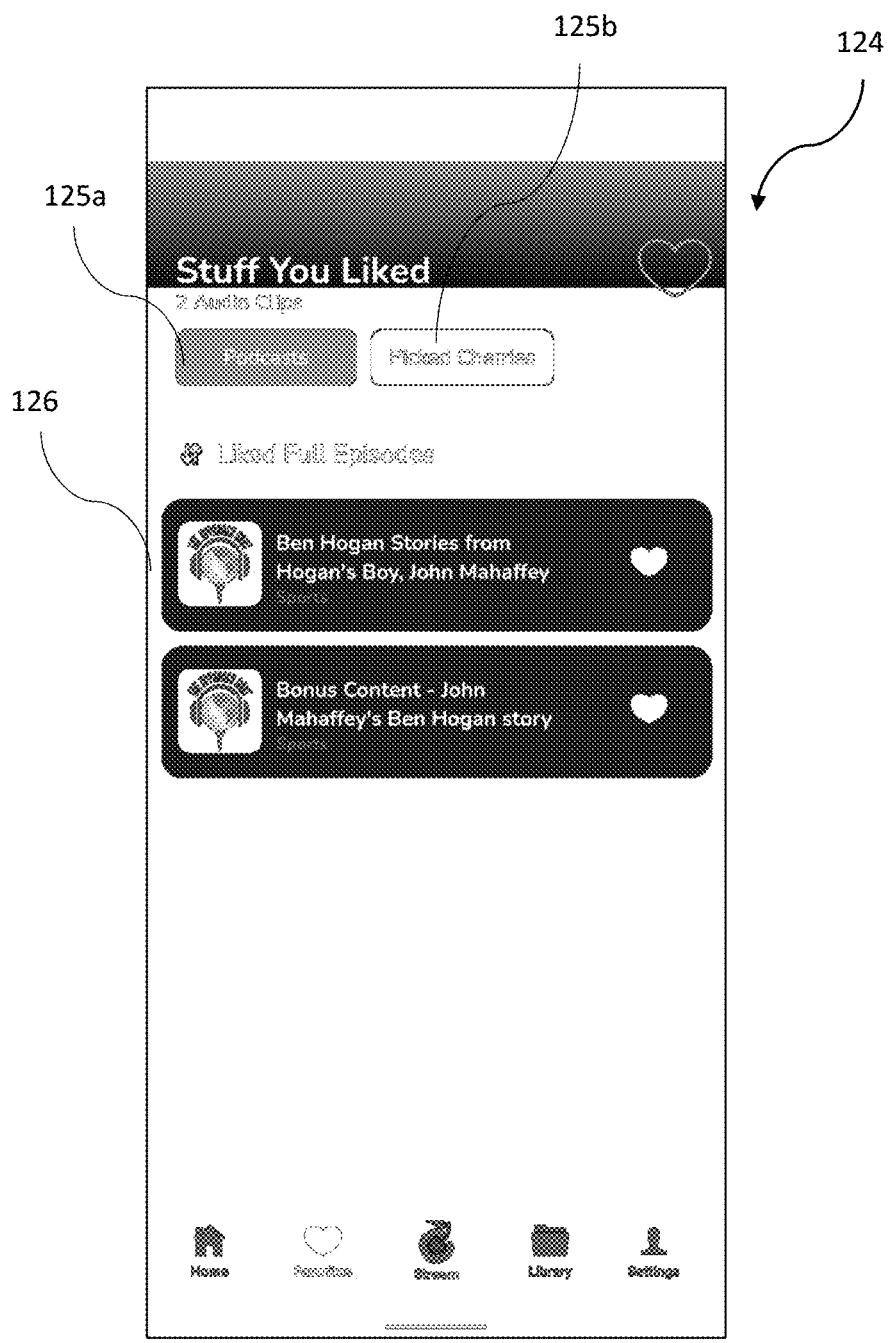
Figure 7:
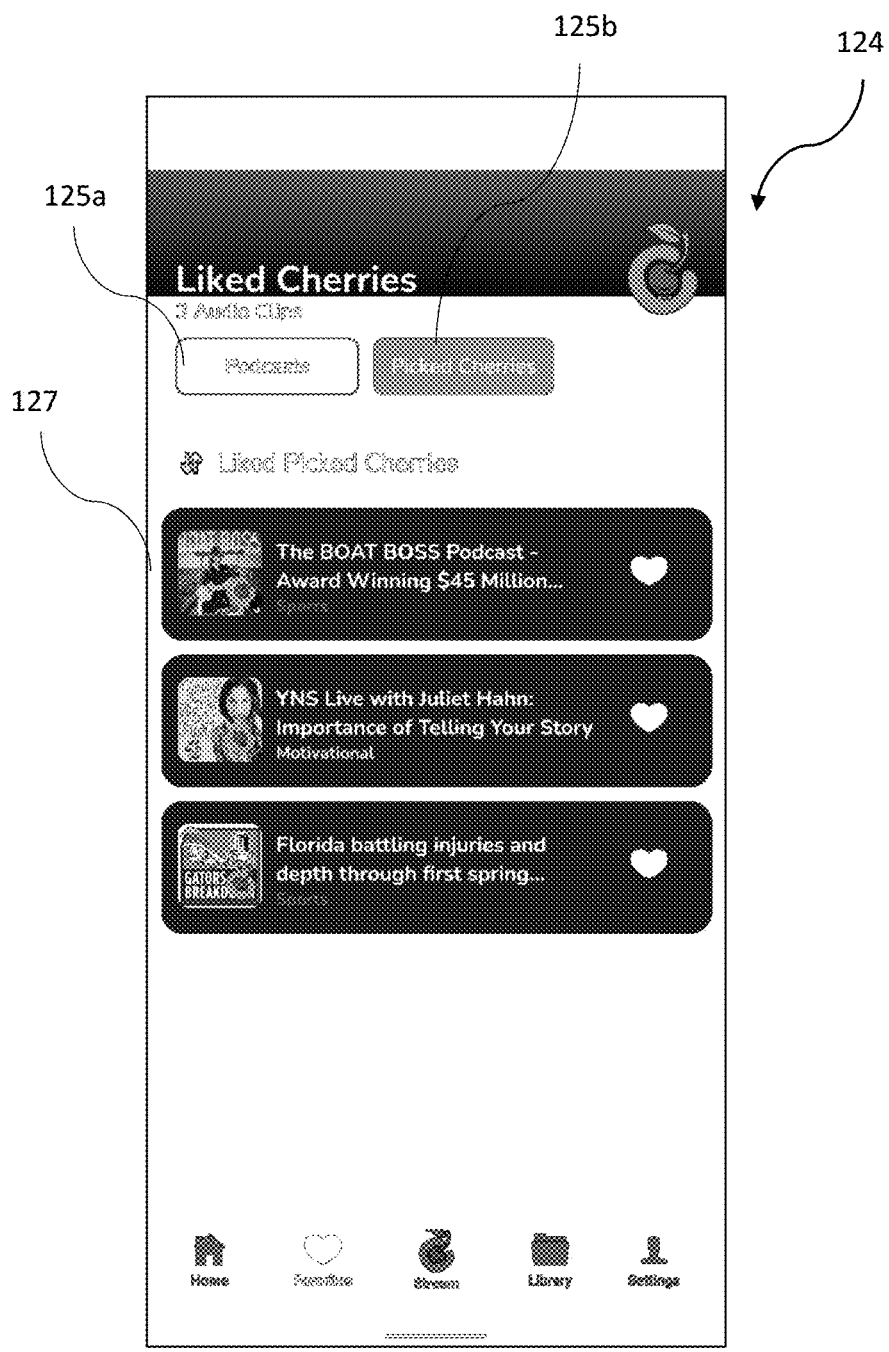
Figure 8:
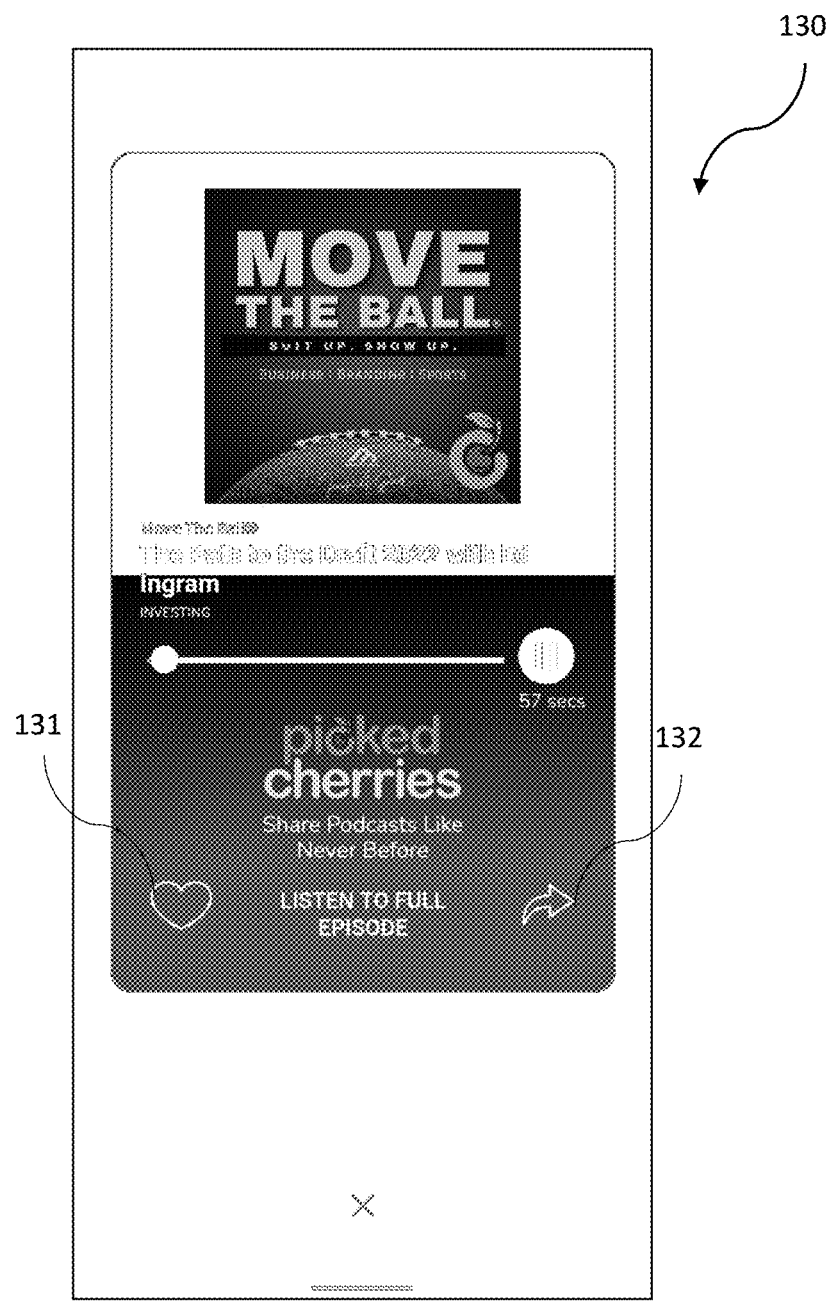

Referring now to FIGS. 6-8, in particular, the processor is configured to render a GUI including a favorites screen GUI 124 on the display 107. The favorites screen GUI 124 illustratively includes tabs 125a-125b accessing a listing 126 of audio podcast files that have been noted as "liked" within the podcast software, and a listing 127 of audio snippets 114 that have been noted as "liked" within the podcast software. As shown, there are two liked audio podcast files, and three liked audio snippets 114. If the respective user 115a-115n selects any of the liked audio snippets 114, the GUI transitions to a snippet playback GUI 130 shown in FIG. 8. The snippet playback GUI 130 includes a like button 131 for toggling the liked status of the given audio snippet 114, and a share button 132 for sharing the given audio snippet.

Figure 9:
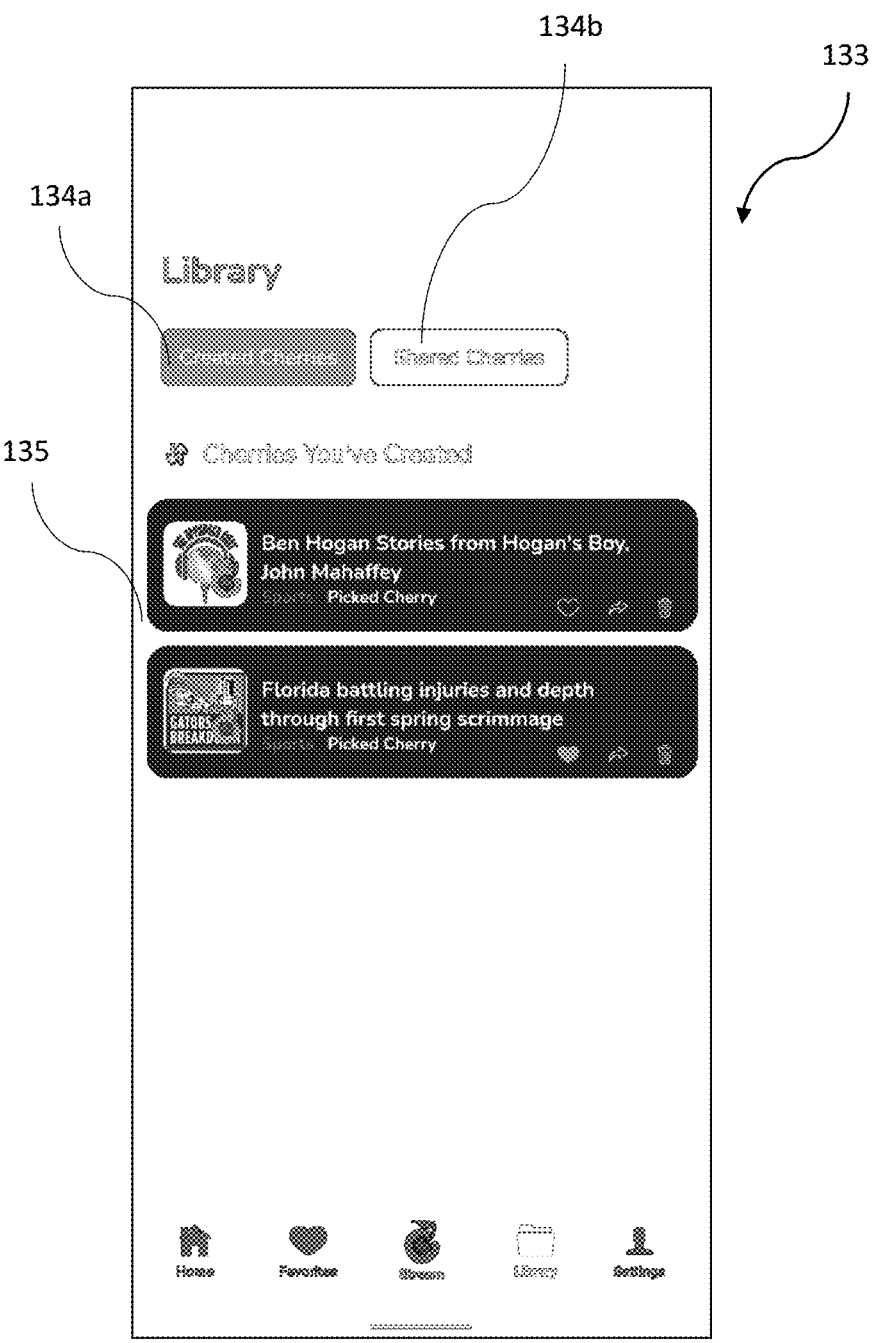
Figure 10:
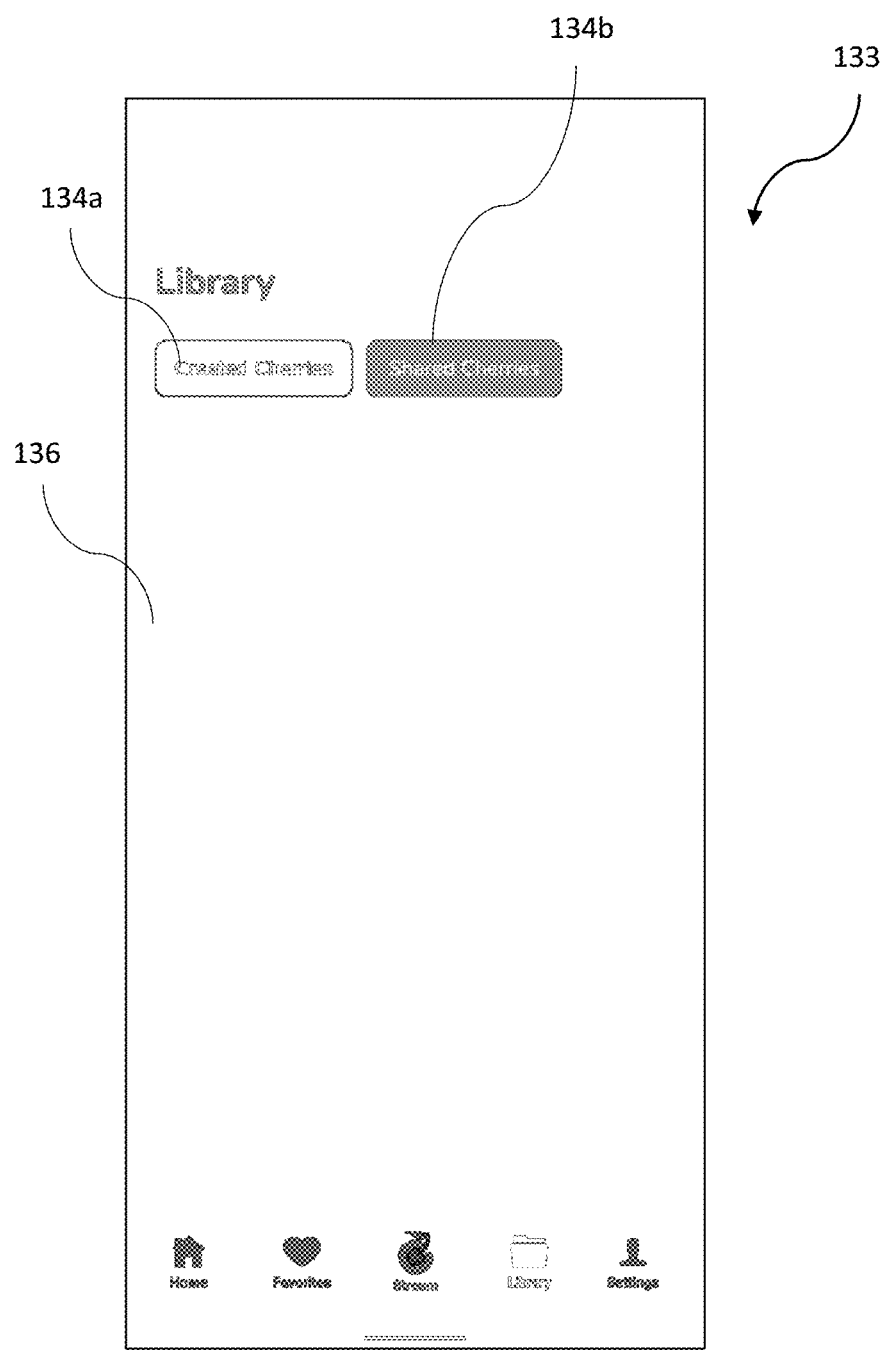

Referring now to FIGS. 9-10, in particular, the processor is configured to render a GUI including a library screen GUI 133 on the display 107. The library screen GUI 133 illustratively includes tabs 134a-134b accessing a listing 135 of audio snippets 114 that have created with the podcast software, and a listing 136 of audio snippets 114 that have been shared with the podcast software. As shown, there are two created audio snippets 114, and no shared audio snippets.

Figure 11:
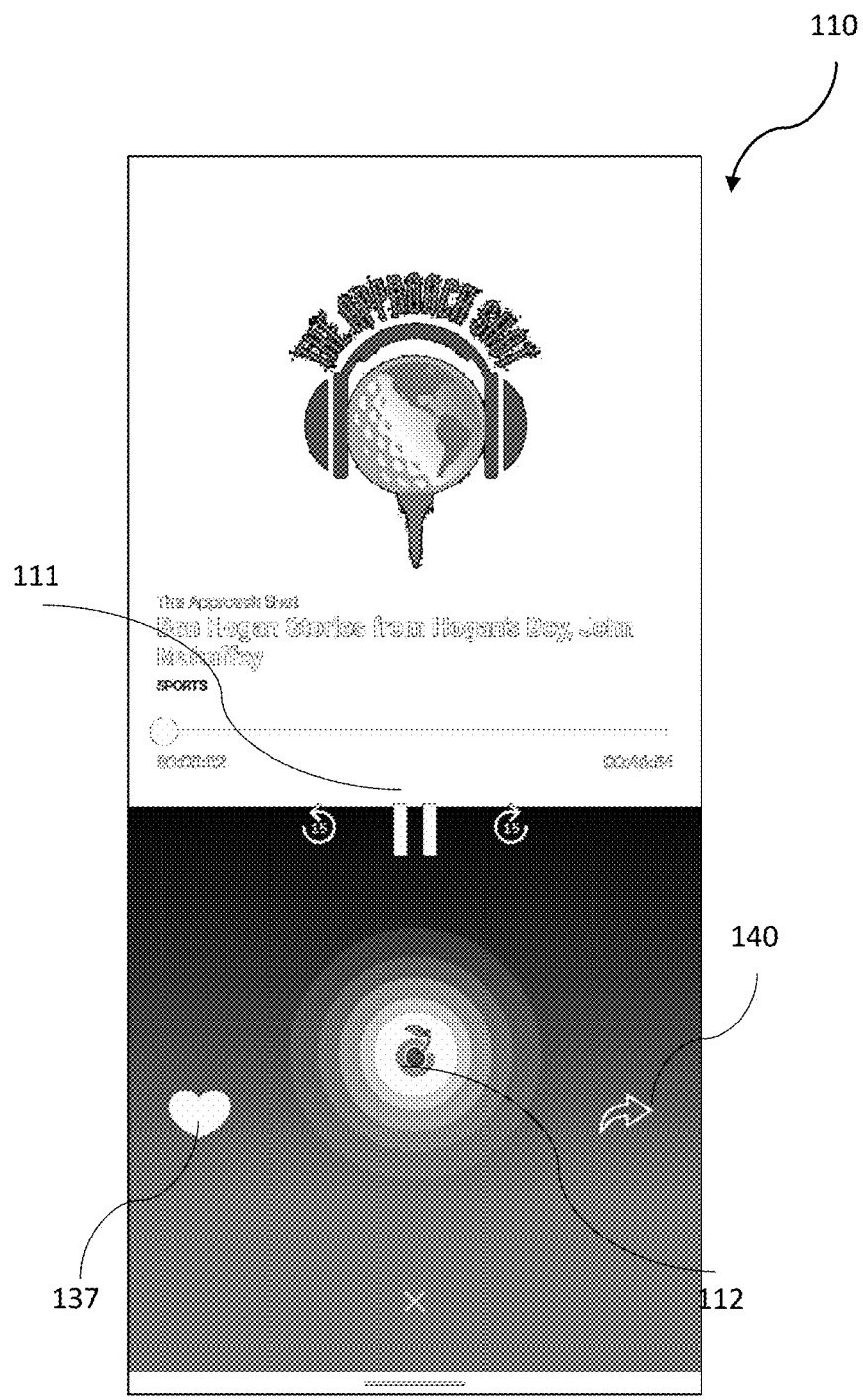
Figure 12:
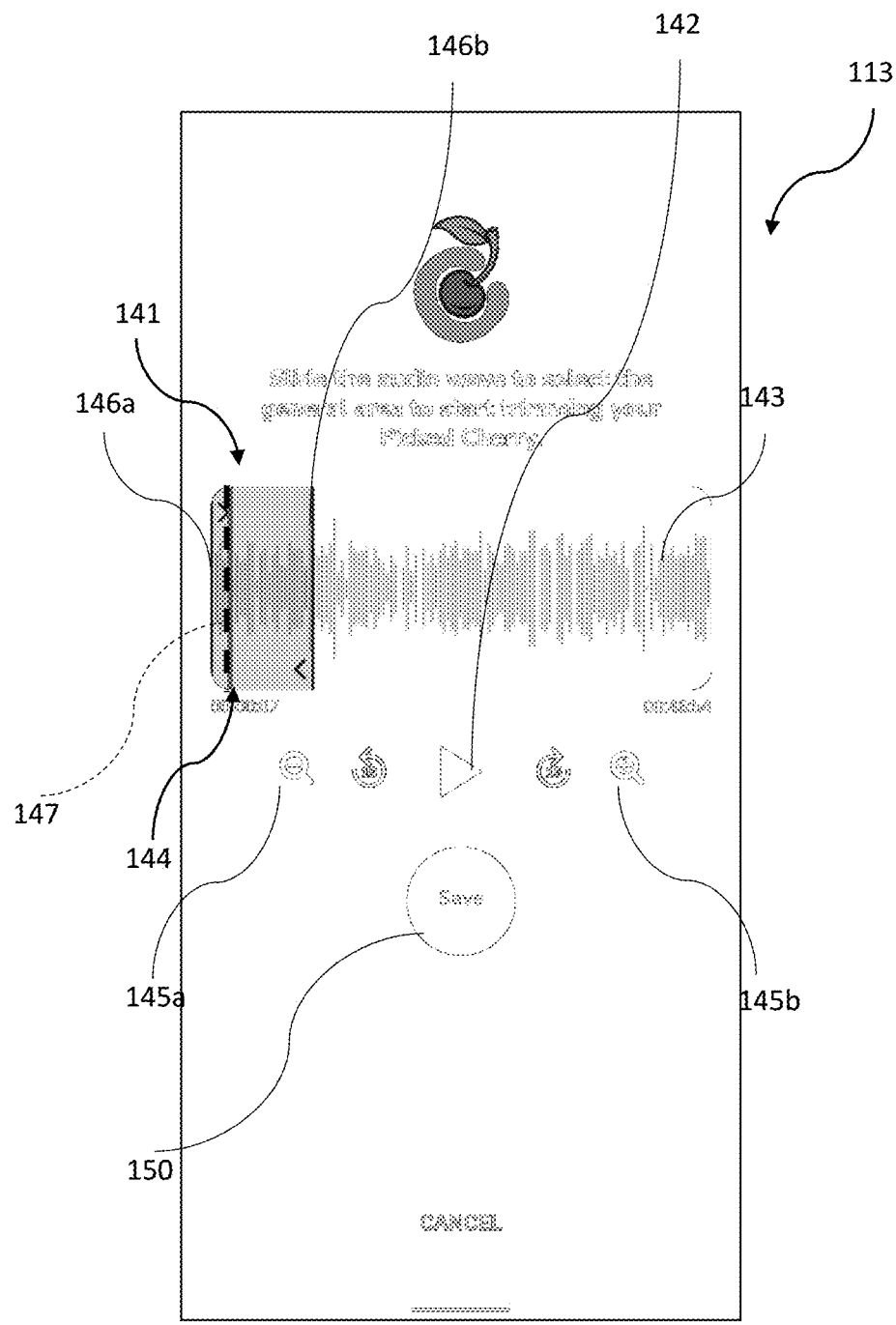
Figure 13:
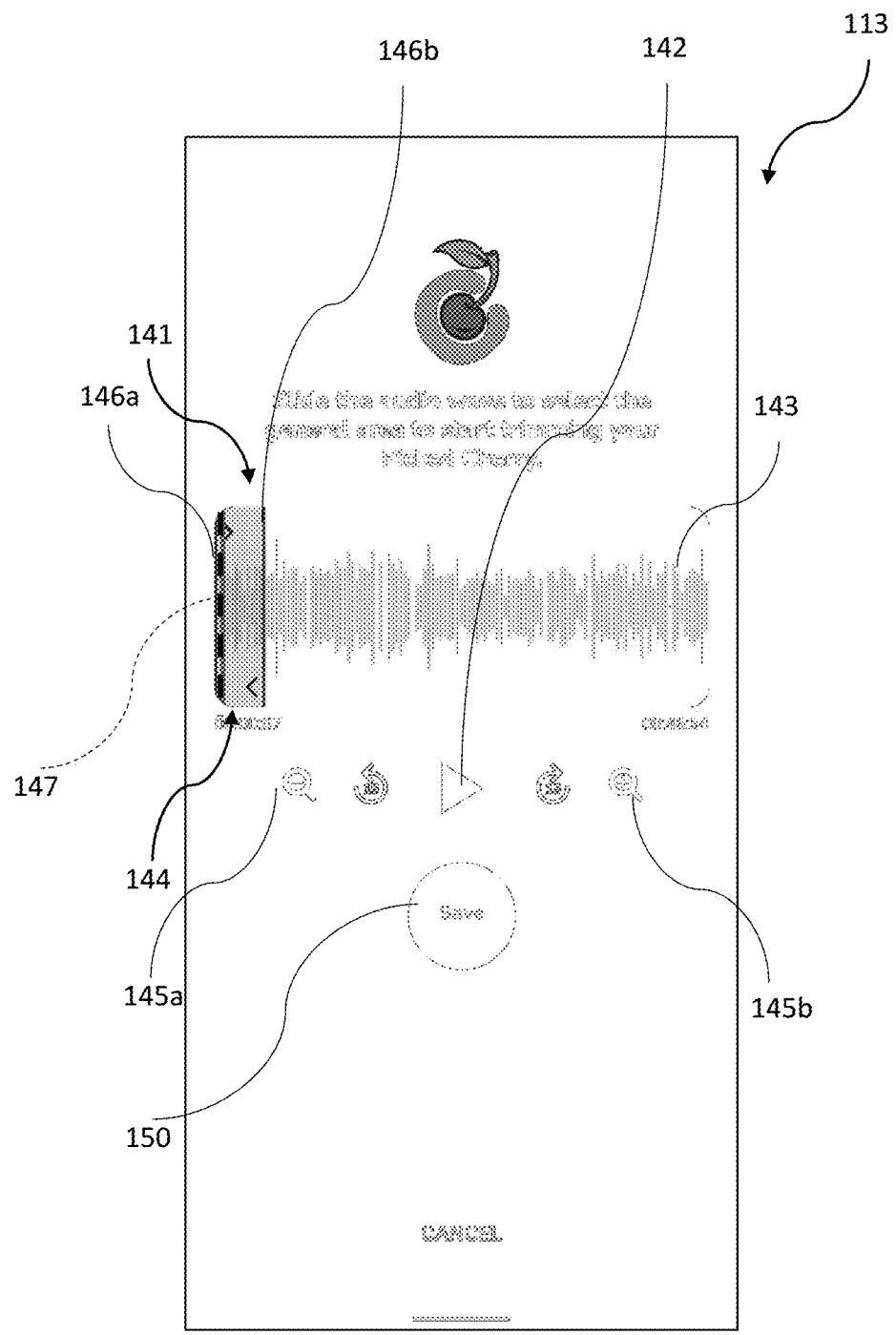
Figure 14:
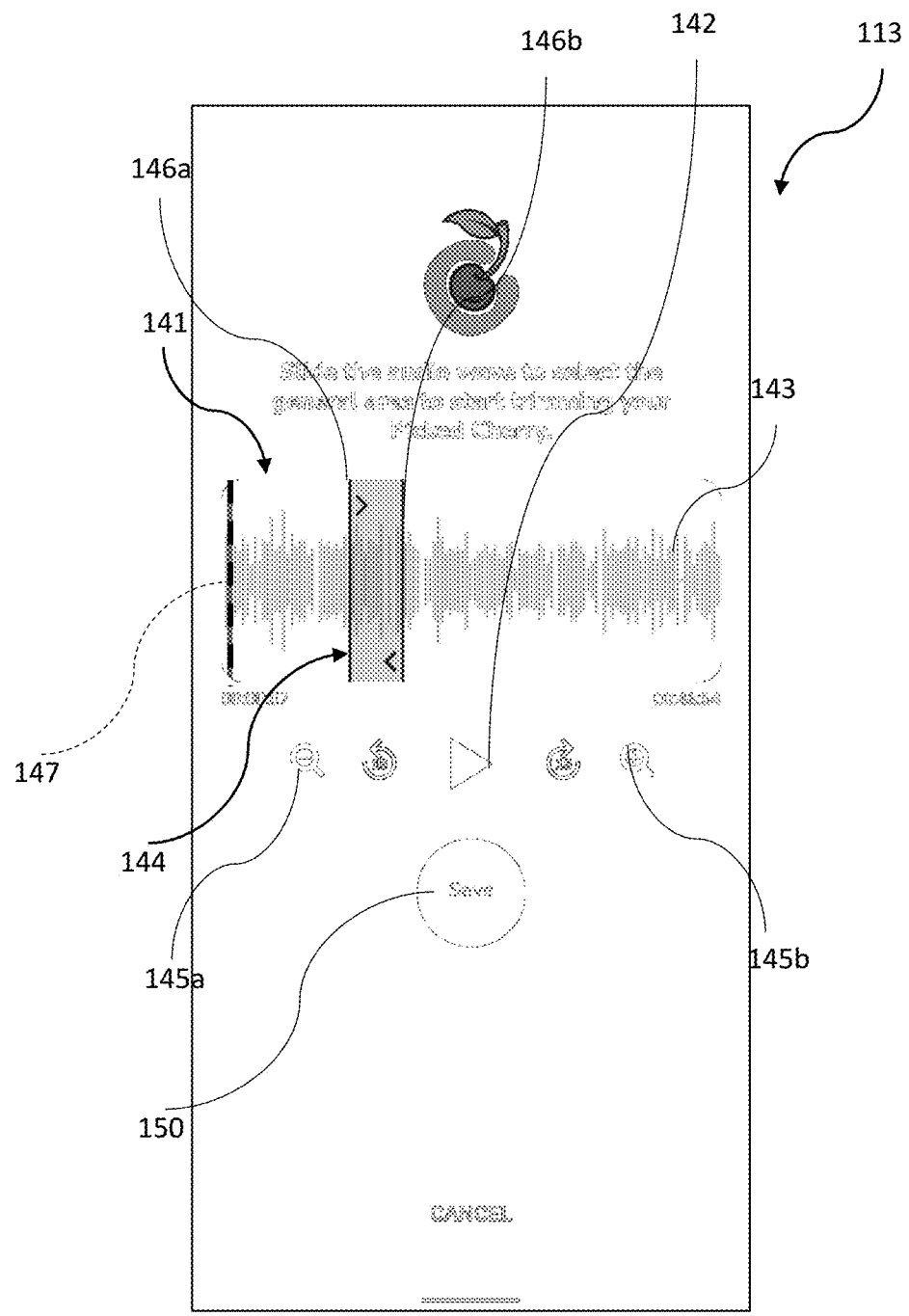
Figure 15:
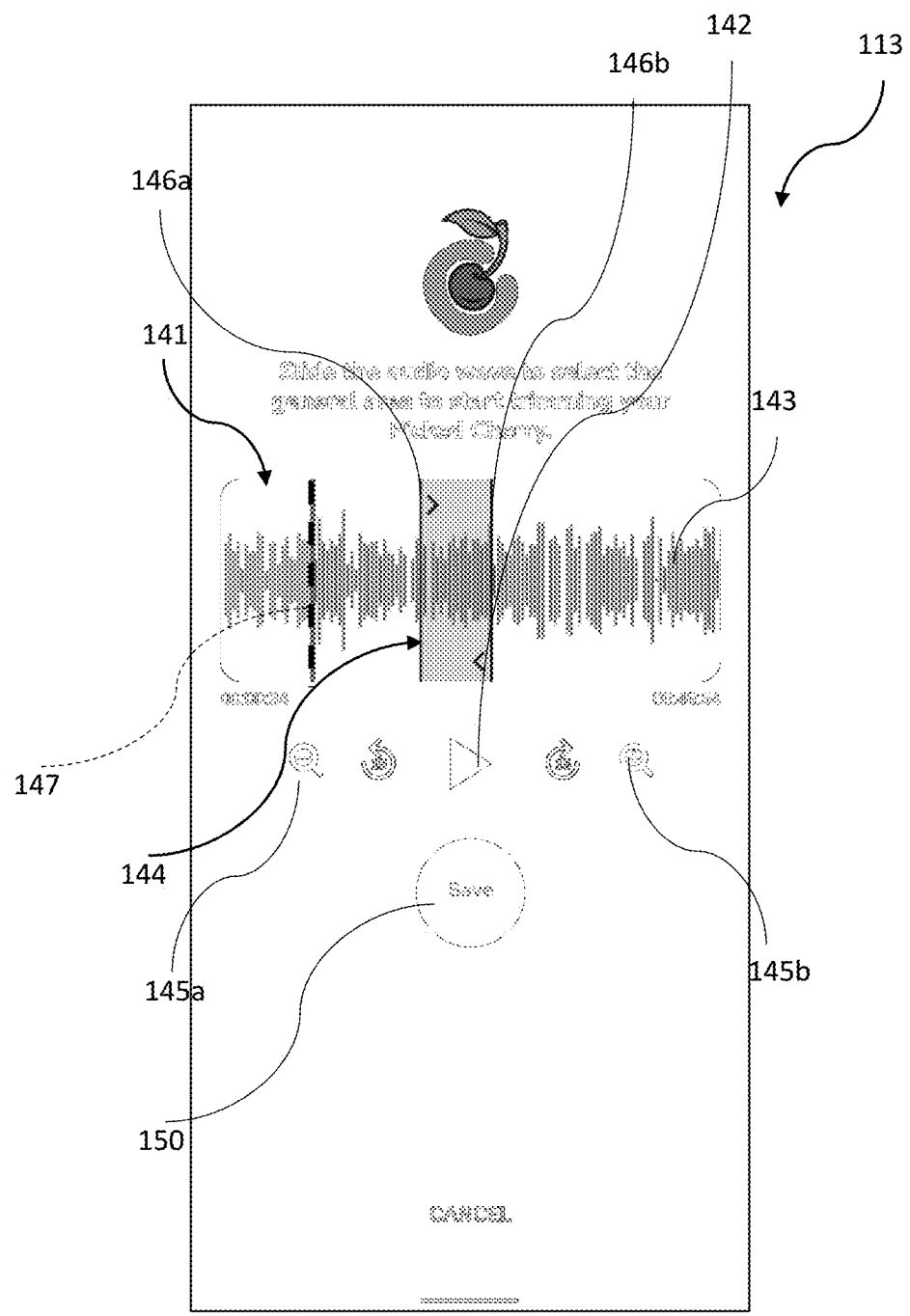

Referring now to FIG. 11, in particular, the processor is configured to render a GUI including an audio playback GUI 110 on the display 107. The audio playback GUI 110 illustratively comprises a playback control user input 111, an audio snippet creation user input 112, a like button 137 for toggling the liked status of the given audio podcast file, and a share button 140 for sharing the given audio podcast.

Referring now to FIGS. 12-15, the processor 106 is configured to when the audio snippet creation user input 112 is activated, render the GUI to comprise the audio snippet creation GUI 113 for generating an audio snippet 114 of the given podcast audio file 102. In particular, the audio snippet creation GUI 113 includes a visual waveform input 141, and an audio snippet creation playback control user input 142. The visual waveform input 141 includes a displayed audio waveform 143, a slidable time domain selection input 144 for the audio snippet 114 of the given podcast audio file 102, and zoom control inputs 145a-145b for viewing specific portions of the audio waveform.

When the zoom control inputs 145a-145b are used to zoom out, the displayed audio waveform 143 may comprise a waveform extending for an entirety of the given podcast audio file 102. The slidable time domain selection input 144 for the audio snippet 114 may have a default position based upon a current playback position in the given podcast audio file 102. For example, the default position may comprise placing the slidable time domain selection input 144 to cover 10 seconds before the current playback position and 50 seconds after the current playback position. The slidable time domain selection input 144 may have a maximum time duration, such as 60 second, for example. The slidable time domain selection input 144 for the audio snippet 114 of the given podcast audio file 102 comprises first and second vertical bars 146a-146b (i.e. the start and end marks for the audio snippet) depicting the currently selected slidable time domain selection input, and a third vertical bar 147 (noted with dashes) showing the current playback position of the given audio podcast file.

The audio snippet creation GUI 113 illustratively comprises a save input 150 for creating the audio snippet 114. Once the audio snippet 114 has been created, the GUI transitions to the snippet playback GUI 130 shown in FIG. 8. In some embodiments, the audio snippet creation GUI 113 may include a text editing feature for generating a text caption for the audio snippet 114 of the given podcast audio file 102, which is uploaded and stored as associated metadata.

Figure 16:
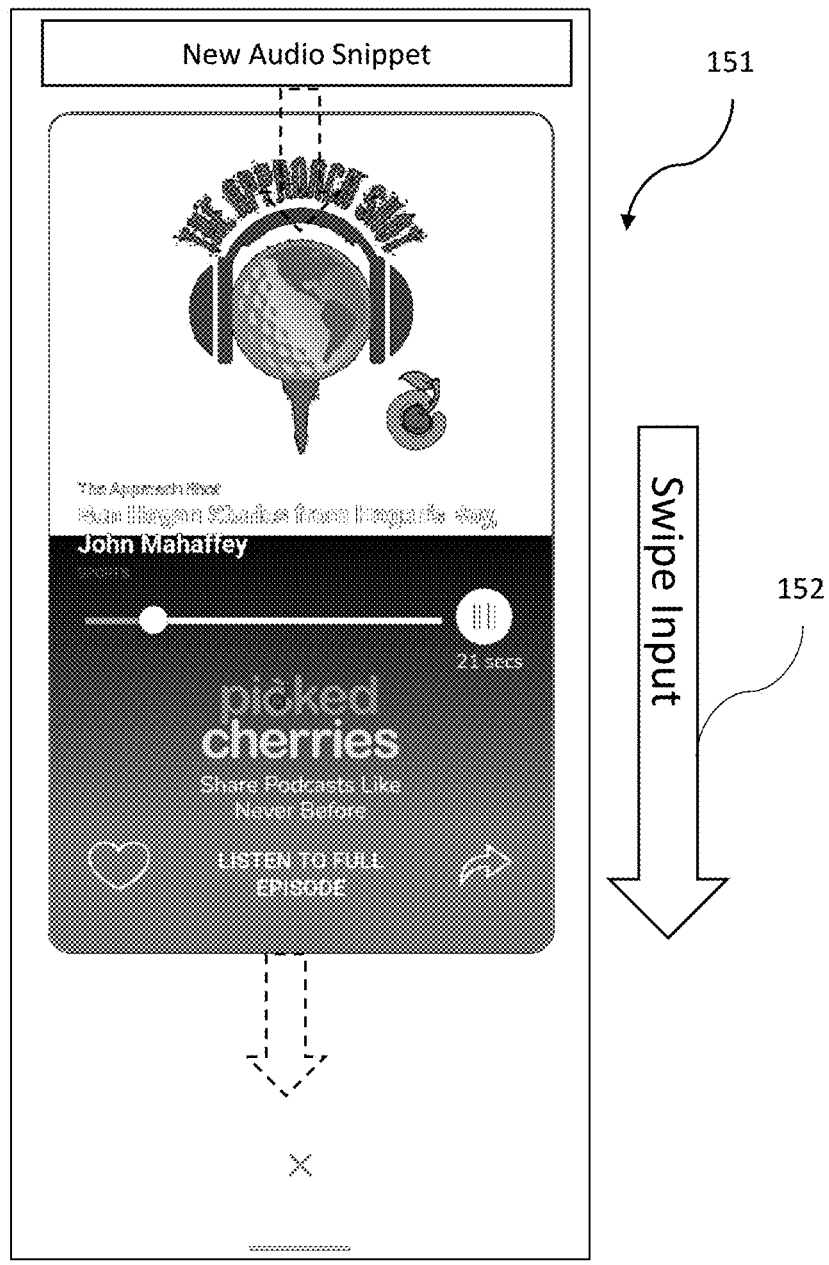
Figure 17:
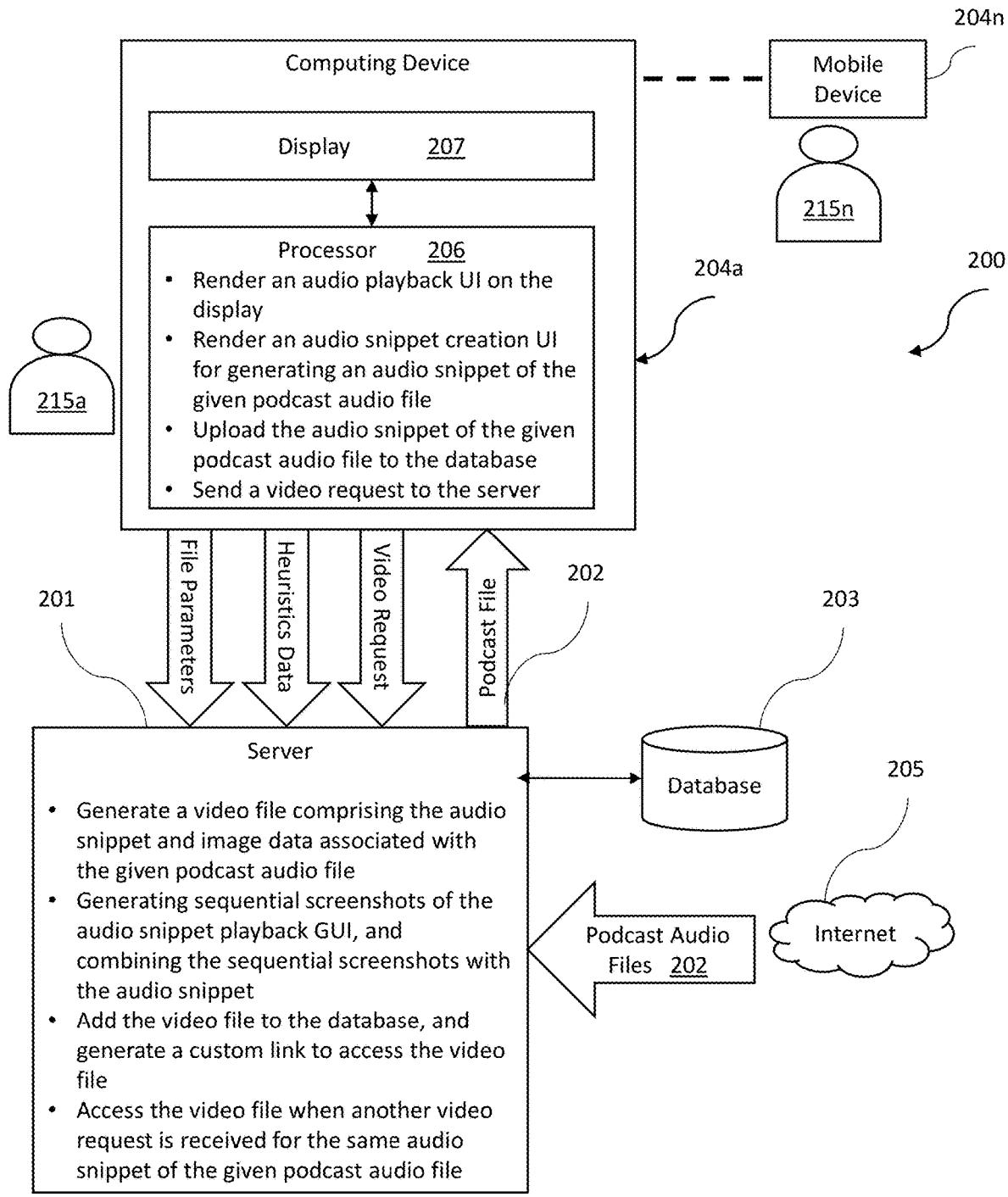
FIG. 17 is a schematic diagram of a second embodiment of the audio podcast distribution system, according to the present disclosure.

Referring now to FIG. 16, the processor 106 is configured to render an audio snippet discovery GUI 151 on the display 107 for viewing the plurality of audio snippets. The audio snippet discovery GUI 151 configured to receive swipe input 152 to scroll through the plurality of audio snippets 114.

Another aspect is directed to a method for operating a computing device 104a in an audio podcast distribution system 100 comprising a server 101 configured to aggregate and store a plurality of podcast audio files 102 in a database 103. Although depicted separately for drawing clarity, it should be appreciated that the database 103 and the server 101 may be integrated in some embodiments. The computing device 104a is in communication with the server 101. The method includes rendering an audio playback GUI 110 on a display 107 for playing a given podcast audio file 102 from the database 103. The audio playback GUI 110 comprises a playback control user input 111, and an audio snippet creation user input 112. The method further includes when the audio snippet creation user input 112 is activated, rendering an audio snippet creation GUI 113 for generating an audio snippet 114 of the given podcast audio file 102, and uploading the audio snippet of the given podcast audio file to the database 103.

Yet another aspect is directed to a non-transitory computer-readable medium for operating a computing device 104a in an audio podcast distribution system comprising a server 101 configured to aggregate and store a plurality of podcast audio files 102 in a database 103. The computing device 104a is in communication with the server 101. The non-transitory computer-readable medium has computer-executable instructions for causing the computing device 104a to perform steps comprising rendering an audio playback GUI 110 on a display 107 for playing a given podcast audio file 102 from the database 103. The audio playback GUI 110 comprises a playback control user input 111, and an audio snippet creation user input 112. The steps further comprises when the audio snippet creation user input 112 is activated, rendering an audio snippet creation GUI 113 for generating an audio snippet 114 of the given podcast audio file 102, and uploading the audio snippet of the given podcast audio file to the database 103.

In the following, a discussion of an example embodiment of the audio podcast distribution system 100 is provided. It should be appreciated that any of the features discussed below can be incorporated with the features of the embodiments disclosed hereinabove, and vice versa. Here, the computing device 104a or the server 101 is configured to perform an import process of the plurality of podcast audio files 102. The import process begins with an input file (e.g. a comma-separated values (CSV) file) that itemizes the plurality of podcast audio files 102 that are to be imported onto the audio podcast distribution system 100. The input file is parsed and processed so that each discovered podcast audio file 102 has a valid category identification, a hex color (denoting the background color shown in the companion podcast application), and an RSS uniform resource locator (URL). Each discovered podcast audio file 102 has their RSS feed downloaded and parsed in order to extract metadata (e.g. podcast title, description, etc.). The discovered podcast audio files 102 that have valid RSS URLs that can be parsed are added to the podcasts-to-import table in the database 103. Once the input file is fully processed, the import process pivots to the update phase.

During the update phase, the plurality of podcast audio files 102 are downloaded and stored for future processing. Podcast audio file details are extracted from the RSS feed and recorded in a podcast-episodes table. For each episode that is discovered in the RSS, the computing device 104a will attempt to download the audio file (e.g. MP3 format file) associated with the episode. The downloaded episode is stored for episode playback within the computing device 104a and in order to generate audio clips later when the respective user 115a-115n creates the audio snippet. Once downloaded, the podcast audio file is verified as a valid audio format file. If the podcast audio file passes verification, the computing device 104a uses a PHP audio waveform generator to extract audio peaks in order to generate the audio visualization in the podcast software. The waveform generator uses the SoX library to manipulate audio, as available from Source Forge. The SoX library is also used later to generate audio snippets. The episode peaks are stored in the database in order to avoid having to re-generate the data on demand later. Once a file has audio peaks data associated with it, it becomes available in the podcast software.

In this embodiment, the audio podcast distribution system 100 may provide for podcast discovery. In particular, the audio podcast distribution system 100 leverages a two-prong approach to showcase content that will engage the user 115a-115n. The first is the home page layout (i.e. the home screen GUI 116) that aggregates potentially compelling content into distinct sections. The banner area (i.e. the top suggested podcast menu 117) of the homepage shows six random podcasts that have been flagged as featured in the database 103. The "Jump Back In" section (i.e. the continued playback menu 120) allows users 115a-115n to resume playback between podcast software sessions. The "Most Recent Cherries" section (i.e. the most recent audio snippet menu 121) lists the eight of the most recently created audio snippets across all categories. The "Cherries For You" section (i.e. the suggested audio snippet menu 122) lists a random selection of the six of the most recently created audio snippets across all subscribed categories for the respective user 115a-115n. Finally, the homepage shows up to three random categories (i.e. the subject matter specific menus 123a-123b) that the respective user 115a-115n is subscribed to. Each category section shows three random audio snippets and three random audio podcast files.

The second approach to content discovery is the audio stream feature, which is provided within the audio snippet discovery GUI 151. The audio stream is available as a pull-up component on the podcast software. The audio snippet discovery GUI 151 will populate with a random selection of episodes and audio snippets based on the subscribed categories of the respective user 115a-115n. The audio snippet discovery GUI 151 will trigger playback of the next piece of content upon completion of the current audio. Alternatively, the respective user 115a-115n can scroll down to skip the current content and continuously discover new podcasts.

In this embodiment, the audio podcast distribution system 100 may provide for audio snippet creation. When the respective user 115a-115n chooses to create an audio snippet from an episode, the podcast software transitions to the audio snippet creation GUI 113 where the respective user's current playback position is marked on the audio waveform visualization. A pre-selected sixty second section or region of the waveform is highlighted. The respective user 115a-115n may drag the entire highlighted area back and forth along the waveform, and can also adjust the beginning and ending of the clip manually by sliding the first and second vertical bars 146a-146b. Once the respective user 115a-115n has finalized their selection, their request is submitted to the server 101 to generate a new MP3 file using the start time and duration submitted (e.g. using the first and SOX library). The newly created audio snippet is stored on the server 101 and indexed in the database 103 for showcasing within the podcast software.

Advantageously, the audio podcast distribution system 100 may provide for enhanced usability over existing podcast software applications. In particular, the audio podcast distribution system 100 provides for superior sharing features by allowing the user 115a-115n to create sharable audio snippets 114 of the given podcast audio file 102 in band and within the same software application. Helpfully, the audio snippet 114 is conveniently uploaded to the server 101 for easy sharing and access. Moreover, the audio podcast distribution system 100 aggregates and ranks the audio snippets 114 from all the users 115a-115n, and provides for improved content discovery.

Referring now additionally to FIGS. 17-22, another embodiment of the audio podcast distribution system 200 is now described. In this embodiment of the audio podcast distribution system 200, those elements already discussed above with respect to FIGS. 1-16 are incremented by 100 and most require no further discussion herein. This embodiment differs from the previous embodiment in that this audio podcast distribution system 200 is configured to generate sharable video files of the audio snippets 214. It should be appreciated by those skilled in the art that the features of the disclosed audio podcast distribution systems 100, 200 may be selectively combined.

Figure 18:
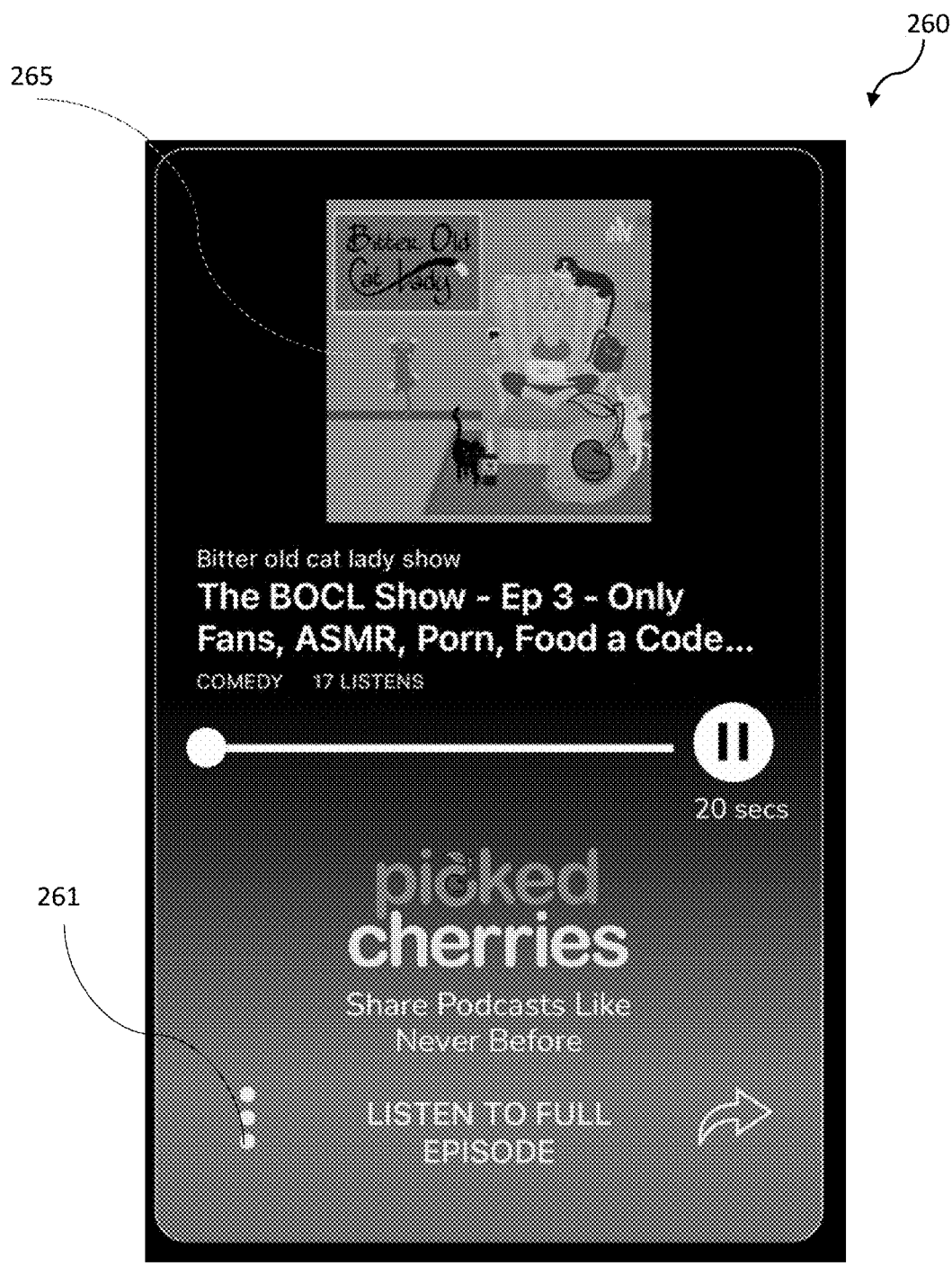
FIGS. 18-22 are screenshots of an example embodiment GUI from the computing device of the audio podcast distribution system of FIG. 17.
Figure 19:
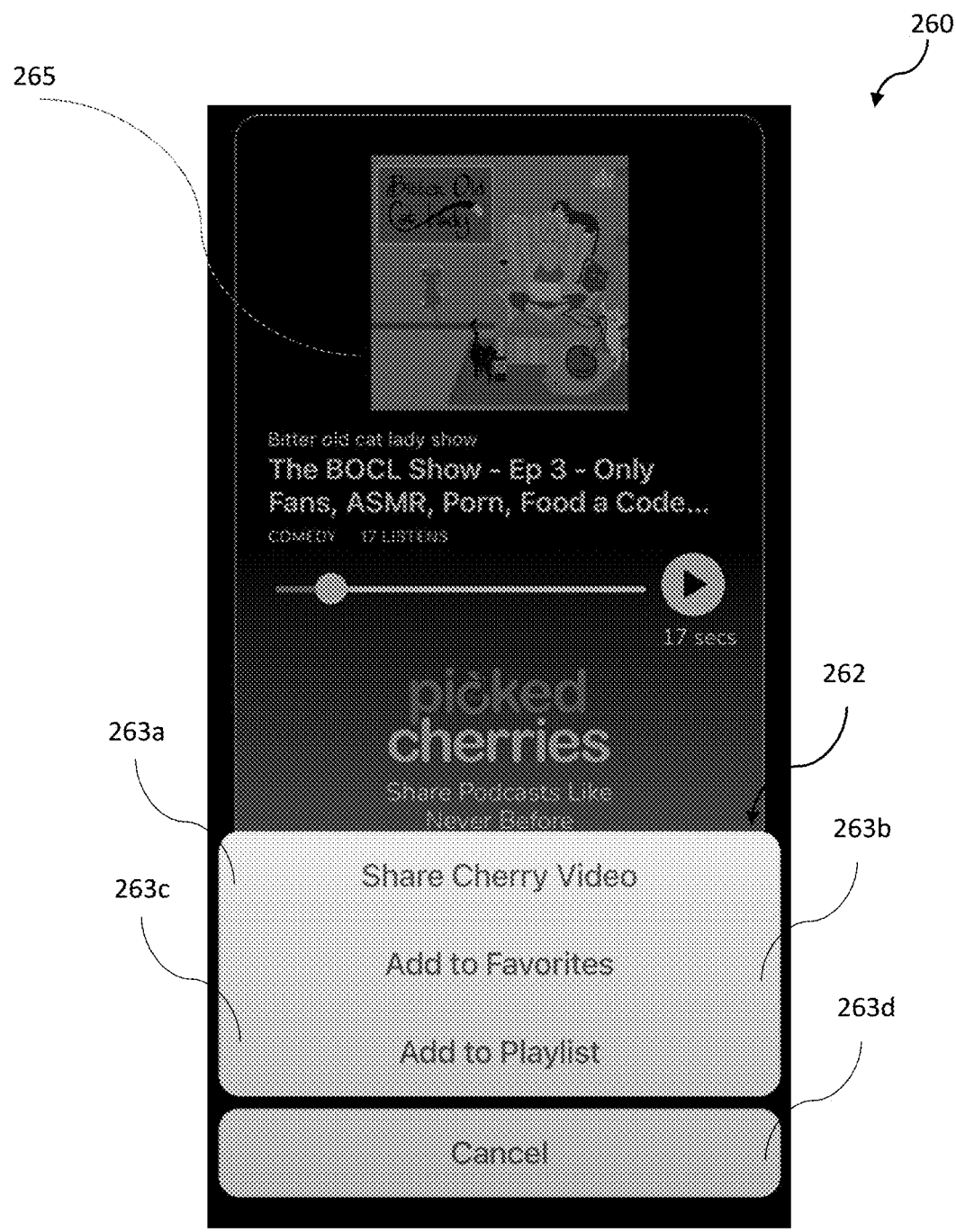

As shown in FIG. 18, the processor 206 of the computing device 204a is configured to render an audio snippet playback GUI 260 on the display 207 when a given audio snippet 214 is selected for playback. The audio snippet playback GUI 260 illustratively comprises a submenu input 261, which provides access to an audio snippet submenu 262 shown in FIG. 19. The audio snippet submenu 262 illustratively includes a video creation user input 263a, a favorite user input 263b for classifying the given audio snippet 214 as a favorite for the user 215a, a playlist user input 263c for adding the given audio snippet onto a playlist for the user 215c, and a cancel user input 263d for exiting the audio snippet submenu.

The processor 206 is configured to when the video creation user input 263a is activated, send a video request (e.g., communication message sent over the Internet 205) to the server 201. The video request is associated with the audio snippet 214 of the given podcast audio file (i.e. the one being played currently within the audio snippet playback GUI 260: "The BOCL Show").

The server 201 is configured to, based upon the video request, generate a video file comprising the audio snippet 214 of the given podcast audio file 202, and image data 265 in the database 203 associated with the given podcast audio file. As will be appreciated by those skilled in the art, the image data 265 in the database 203 associated with the given podcast audio file 202 may comprise the illustrated example of album cover image data from the given podcast audio file. In some embodiments, if the given podcast audio file 202 was derived from a full length video podcast source (i.e., the given podcast audio file was derived from the audio track of the video podcast source), the image data may comprise the original video data associated with the audio snippet 214.

Figure 20:
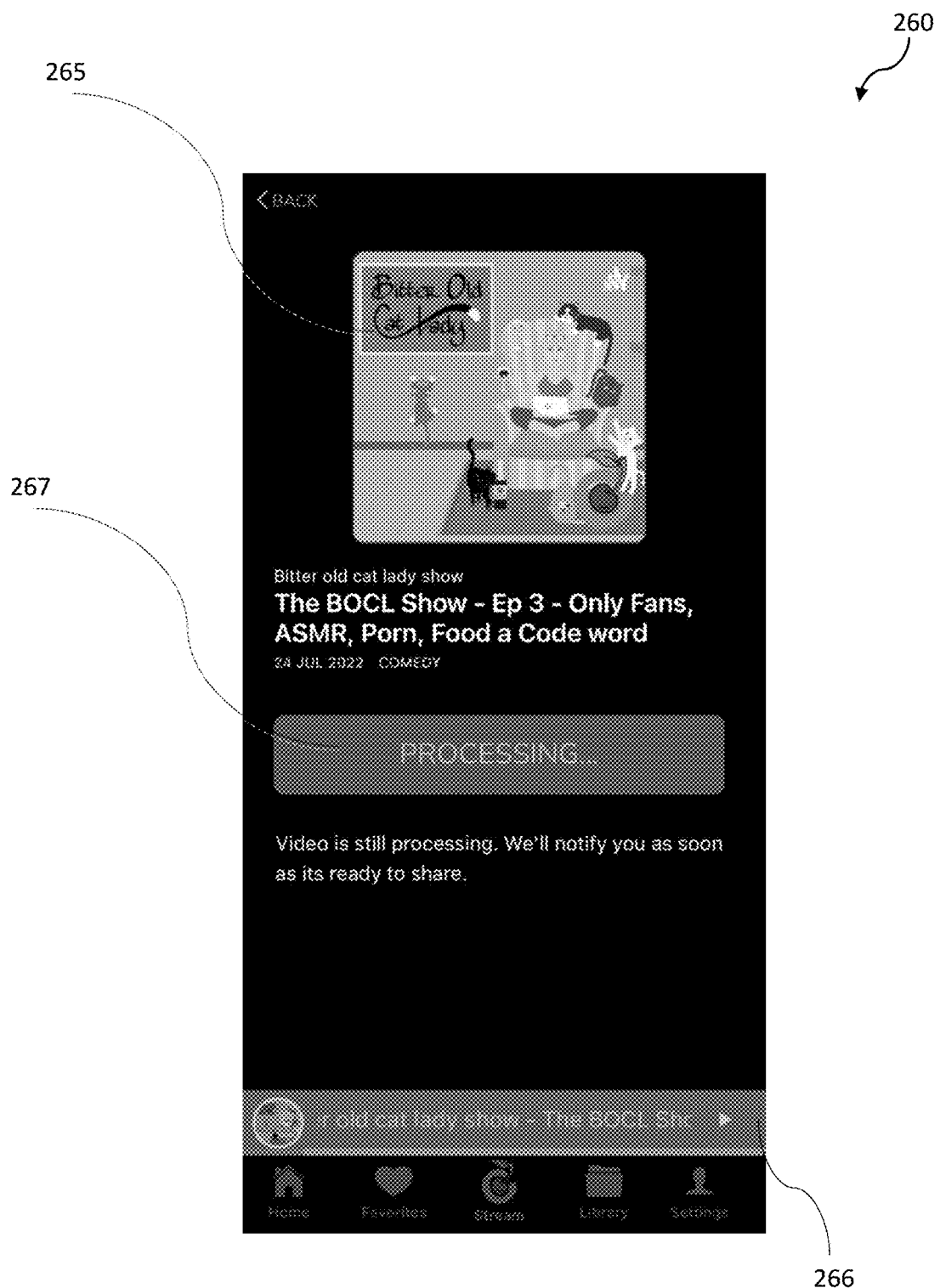

Once the server 201 receives the video request, the audio snippet playback GUI 260 transitions to a processing mode shown in FIG. 20. Here, the audio snippet playback GUI 260 illustratively comprises a playback input 266 miniaturized at a bottommost edge of the display 207, and a status indicator 267 for providing a status of the processing of the video file.

To avoid duplicative processing and storage, the server 201 is configured to access the video file when another video request is received for the same audio snippet 214 of the given podcast audio file 202. In other words, if another user 215a-215n generates a video request for the same audio snippet 214 of the given podcast audio file 202, rather than creating another video file, the server 201 retrieves the stored information from the prior created video file and provides that to the other user.

Figure 21:
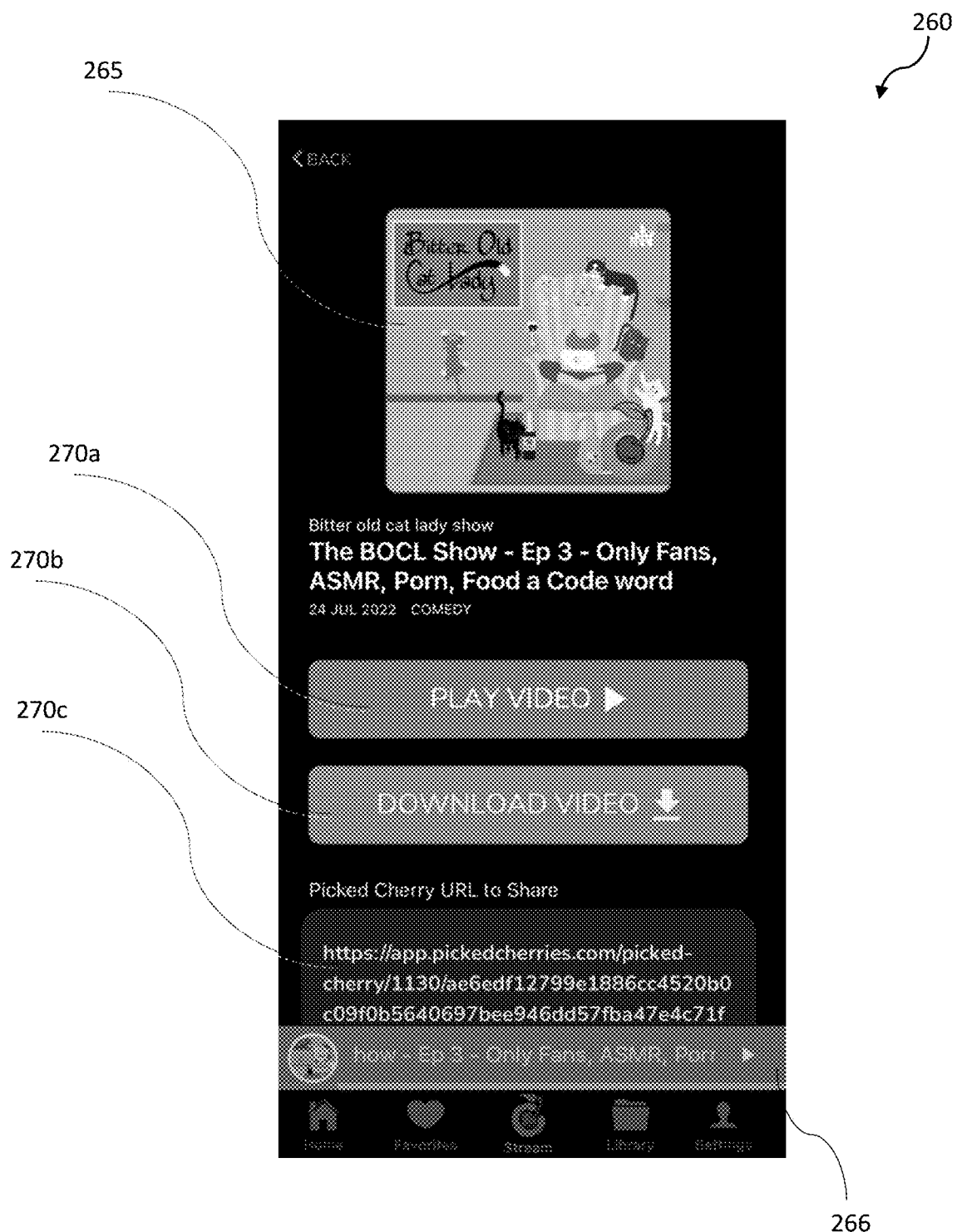
Figure 22:

Once the video file has been processed by the server 201, the audio snippet playback GUI 260 transitions to a completion stage shown in FIG. 21. Additionally, the server 201 is illustratively configured to add the video file of the audio snippet 214 of the given podcast audio file 202 to the database 203, and generate a custom link to access the video file within the database. Here, the audio snippet playback GUI 260 illustratively comprises a play input 270a for playing the video file from the server 201, a download input 270b to download the video file to the computing device (i.e. as shown in the library screen GUI 233 of FIG. 22), and a link field 270c providing the custom link to access the video file within the database 203 for sharing on social media platforms (e.g., YouTube, Instagram Reels, Tiktok, etc.). In some embodiments, the server 201 may be configured to generate the video file by at least generating sequential screenshots of the audio snippet playback GUI 260 using a headless web browser instance, for example, and combining the sequential screenshots with the audio snippet 214 of the given podcast audio file 202.

Another aspect is directed to a method for operating an audio podcast distribution system 200 comprising at least one computing device 204a-204n, and a server 201 configured to aggregate and store a plurality of podcast audio files 202 in a database 203. The at least one computing device 204a-204n is in communication with the server 201. The method comprises rendering an audio playback GUI 110 (FIG. 11) on a display 207 of the at least one computing device 204a-204n for playing a given podcast audio file 202 from the database 203. The audio playback GUI 110 comprises a playback control user input 111 (FIG. 11), and an audio snippet creation user input 112 (FIG. 11). The method also includes when the audio snippet creation user input 112 is activated, rendering an audio snippet creation GUI 113

(FIG. 12) on the display of the at least one computing device for generating an audio snippet 214 of the given podcast audio file 202, and uploading a plurality of file parameters for the audio snippet of the given podcast audio file to the database 203. The plurality of file parameters may comprise an episode ID, a user ID, a start time, and a time duration, for example. As will be appreciated, the plurality of file parameters is used by the server to 201 to create the audio snippet 214.

The method also includes rendering an audio snippet playback GUI 260 on the display 207 of the at least one computing device 204a-204n. The audio snippet playback GUI 260 comprises a video creation user input 263a, and when the video creation user input is activated, send a video request to the server 201. The video request is associated with the audio snippet 214 of the given podcast audio file 202. The method also includes generating, at the server 201, based upon the video request a video file comprising the audio snippet 214 of the given podcast audio file 202, and image data 265 in the database 203 associated with the given podcast audio file.

Yet another aspect is directed to a non-transitory computer-readable medium for operating an audio podcast distribution system 200 comprising at least one computing device 204a-204n, and a server 201 configured to aggregate and store a plurality of podcast audio files 202 in a database 203. The non-transitory computer-readable medium has computer-executable instructions for causing the at least one computing device 204a-204n and the server 201 to perform steps of the above described method.

Figure 23:
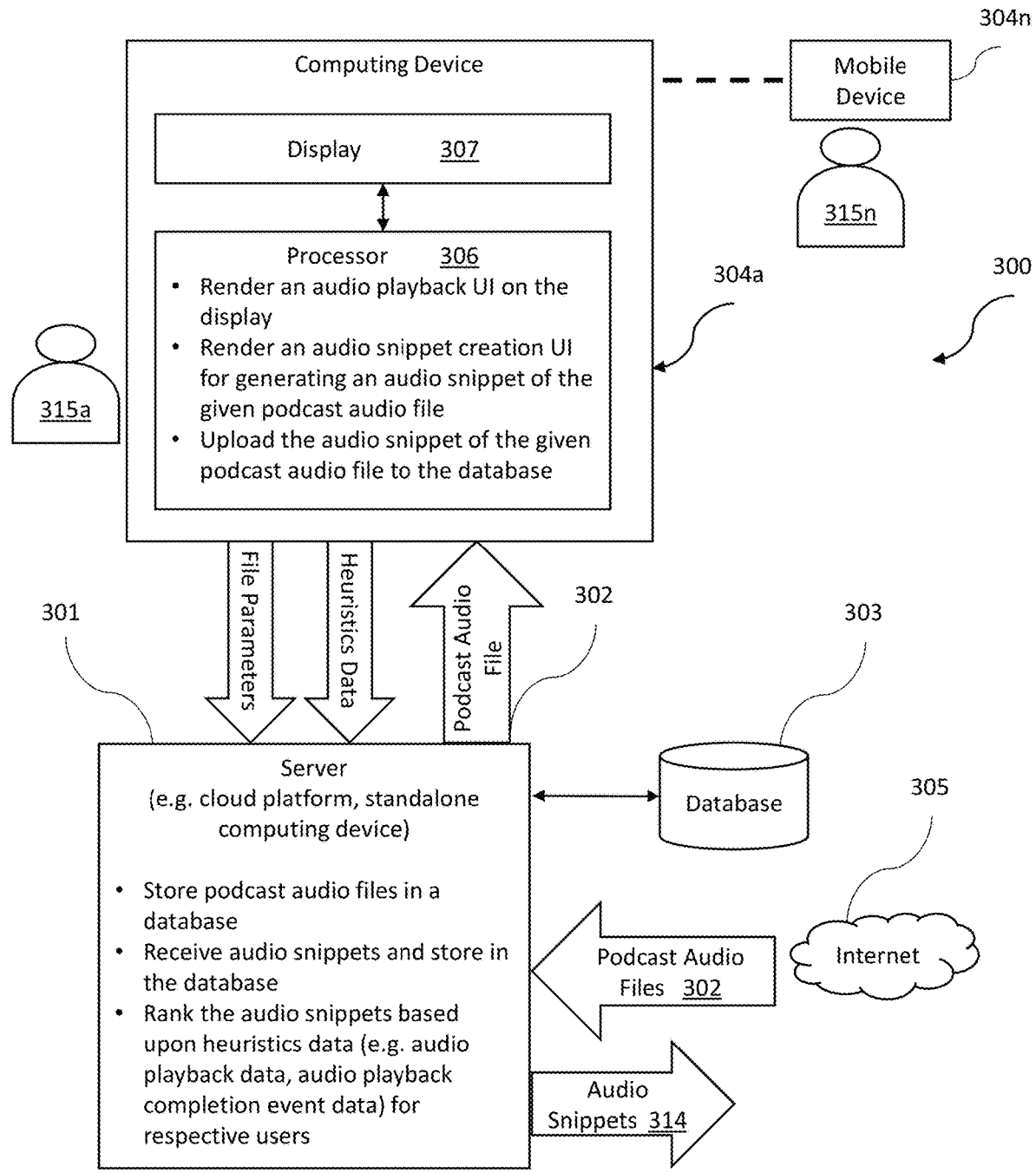
FIG. 23 is a schematic diagram of a third embodiment of the audio podcast distribution system, according to the present disclosure.

Referring now additionally to FIG. 23, another embodiment of the audio podcast distribution system 300 is now described. In this embodiment of the audio podcast distribution system 300, those elements already discussed above with respect to FIGS. 1-16 are incremented by 200 and most require no further discussion herein. This embodiment differs from the previous embodiment in that this processor 306 is configured to when the audio snippet creation user input 312 is activated, render an audio snippet creation GUI 313 (FIGS. 12-15) for generating an audio snippet 314 of the given podcast audio file 302, and upload plurality of file parameters for the audio snippet of the given podcast audio file to the database 303. The plurality of file parameters may comprise an episode ID, a user ID, a start time, and a time duration, for example. As will be appreciated, the plurality of file parameters is used by the server to 301 to create the audio snippet 314. In other embodiments, the audio snippet 314 may be created on the computing device 304a.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An audio podcast distribution system comprising:
   a server configured to aggregate and store a plurality of podcast audio files in a database; and
   at least one computing device in communication with the server, the at least one computing device comprising a processor and a display coupled to the processor, the processor configured to
      render an audio playback graphical user interface (GUI) on the display for playing a given podcast audio file from the database, the audio playback GUI comprising a playback control user input, and an audio snippet creation user input,
      when the audio snippet creation user input is activated, render an audio snippet creation GUI for generating an audio snippet of the given podcast audio file, and upload at least one file parameter for the audio snippet of the given podcast audio file to the database,
      render an audio snippet playback GUI on the display, the audio snippet playback GUI comprising a video creation user input, and
      when the video creation user input is activated, send a video request to the server, the video request being associated with the audio snippet of the given podcast audio file;
   the server configured to, based upon the video request, generate a video file comprising the audio snippet of the given podcast audio file, and image data in the database associated with the given podcast audio file.

2. The audio podcast distribution system of claim 1 wherein the server is configured to add the video file of the audio snippet of the given podcast audio file to the database, and generate a custom link to access the video file within the database.

3. The audio podcast distribution system of claim 1 wherein the server is configured to generate the video file by at least generating sequential screenshots of the audio snippet playback GUI, and combining the sequential screenshots with the audio snippet of the given podcast audio file.

4. The audio podcast distribution system of claim 1 wherein the server is configured to access the video file when another video request is received for the same audio snippet of the given podcast audio file.

5. The audio podcast distribution system of claim 1 wherein the audio snippet creation GUI comprises a visual waveform input, and an audio snippet creation playback control user input.

6. The audio podcast distribution system of claim 1 wherein the server is configured to add the audio snippet of the given podcast audio file to the database, and generate a custom link to access the audio snippet within the database.

7. The audio podcast distribution system of claim 1 wherein the at least one computing device comprises a plurality of computing devices configured to respectively upload a plurality of audio snippets to the server; and wherein the server is configured to rank the plurality of audio snippets based upon heuristics data for respective users associated with the plurality of computing devices.

8. The audio podcast distribution system of claim 7 wherein the heuristic data comprises audio playback data and audio playback completion event data.

9. The audio podcast distribution system of claim 7 wherein the processor is configured to render an audio snippet discovery GUI on the display for viewing the plurality of audio snippets, the audio snippet discovery GUI configured to receive swipe input to scroll through the plurality of audio snippets.

10. A method for operating an audio podcast distribution system comprising at least one computing device, and a server configured to aggregate and store a plurality of podcast audio files in a database, the at least one computing device in communication with the server, the method comprising:
   rendering an audio playback graphical user interface (GUI) on a display of the at least one computing device for playing a given podcast audio file from the database, the audio playback GUI comprising a playback control user input, and an audio snippet creation user input;

when the audio snippet creation user input is activated, rendering an audio snippet creation GUI on the display of the at least one computing device for generating an audio snippet of the given podcast audio file, and uploading at least one file parameter for the audio snippet of the given podcast audio file to the database;

rendering an audio snippet playback GUI on the display of the at least one computing device, the audio snippet playback GUI comprising a video creation user input;

when the video creation user input is activated, send a video request to the server, the video request being associated with the audio snippet of the given podcast audio file; and generating, at the server, based upon the video request a video file comprising the audio snippet of the given podcast audio file, and image data in the database associated with the given podcast audio file.

11. The method of claim 10 further comprising, at the server, adding the video file of the audio snippet of the given podcast audio file to the database, and generating a custom link to access the video file within the database.

12. The method of claim 10 further comprising, at the server, generating the video file by at least generating sequential screenshots of the audio snippet playback GUI, and combining the sequential screenshots with the audio snippet of the given podcast audio file.

13. The method of claim 10 further comprising, at the server, accessing the video file when another video request is received for the same audio snippet of the given podcast audio file.

14. The method of claim 10 wherein the audio snippet creation GUI comprises a visual waveform input, and an audio snippet creation playback control user input.

15. The method of claim 10 wherein the at least one computing device comprises a plurality of computing devices configured to respectively upload a plurality of audio snippets to the server; and wherein the server is configured to rank the plurality of audio snippets based upon heuristics data for respective users associated with the plurality of computing devices.

16. The method of claim 15 wherein the heuristic data comprises audio playback data and audio playback completion event data; and further comprising rendering an audio snippet discovery GUI on the display for viewing the plurality of audio snippets, the audio snippet discovery GUI configured to receive swipe input to scroll through the plurality of audio snippets.

17. A non-transitory computer-readable medium for operating an audio podcast distribution system comprising at least one computing device, and a server configured to aggregate and store a plurality of podcast audio files in a database, the at least one computing device in communication with the server, the non-transitory computer-readable medium having computer-executable instructions for causing the at least one computing device and the server to perform steps comprising:

rendering an audio playback graphical user interface (GUI) on a display of the at least one computing device for playing a given podcast audio file from the database, the audio playback GUI comprising a playback control user input, and an audio snippet creation user input;

when the audio snippet creation user input is activated, rendering an audio snippet creation GUI on the display of the at least one computing device for generating an audio snippet of the given podcast audio file, and uploading at least one file parameter for the audio snippet of the given podcast audio file to the database;

rendering an audio snippet playback GUI on the display of the at least one computing device, the audio snippet playback GUI comprising a video creation user input;

when the video creation user input is activated, send a video request to the server, the video request being associated with the audio snippet of the given podcast audio file; and generating, at the server, based upon the video request a video file comprising the audio snippet of the given podcast audio file, and image data in the database associated with the given podcast audio file.

18. The non-transitory computer-readable medium of claim 17 wherein the steps includes, at the server, adding the video file of the audio snippet of the given podcast audio file to the database, and generating a custom link to access the video file within the database.

19. The non-transitory computer-readable medium of claim 17 wherein the steps includes, at the server, generating the video file by at least generating sequential screenshots of the audio snippet playback GUI, and combining the sequential screenshots with the audio snippet of the given podcast audio file.

20. The non-transitory computer-readable medium of claim 17 wherein the steps includes, at the server, accessing the video file when another video request is received for the same audio snippet of the given podcast audio file.

* * * * *